United States Patent
Yamauchi et al.

[11] Patent Number: 5,828,829
[45] Date of Patent: Oct. 27, 1998

[54] SYSTEM TEST SUPPORT SYSTEM AND SYSTEM TEST SUPPORT METHOD

[75] Inventors: Yoko Yamauchi, Sagamihara; Yuji Tamaki, Niiza; Noboru Fujimaki, Yokohama; Toshiyuki Obi, Funabashi, all of Japan

[73] Assignee: Kabushiki Kaisha Toshiba, Kawasaki, Japan

[21] Appl. No.: 592,709

[22] Filed: Jan. 26, 1996

[30] Foreign Application Priority Data

Feb. 1, 1995 [JP] Japan .................................... 7-014944

[51] Int. Cl.$^6$ .................................................... G06F 9/455
[52] U.S. Cl. ............................... 395/183.14; 395/183.21; 395/527; 395/708
[58] Field of Search ......................... 395/183.14, 183.15, 395/183.21, 185.02, 185.03, 500, 827, 840, 183.12, 183.13, 183.23, 702, 704, 708, 527; 371/27; 324/73.1; 364/943.9, 946.2, 267, 267.91, 264.3, 264.7, 268.6

[56] References Cited

U.S. PATENT DOCUMENTS

| | | | |
|---|---|---|---|
| 5,161,115 | 11/1992 | Teshima et al. | 364/551.01 |
| 5,253,158 | 10/1993 | Suzuki et al. | 364/140 |
| 5,335,339 | 8/1994 | Maejima et al. | 395/500 |
| 5,371,683 | 12/1994 | Fukajawa | 364/489 |
| 5,394,347 | 2/1995 | Kita et al. | 364/578 |
| 5,500,941 | 3/1996 | Gil | 395/183.14 |
| 5,586,125 | 12/1996 | Warner | 371/27 |
| 5,623,680 | 4/1997 | Flora-Holmquist et al. | 395/573 |

FOREIGN PATENT DOCUMENTS

| | | | |
|---|---|---|---|
| 59-151248 | 8/1984 | Japan | G06F 11/22 |
| 60-77248 | 5/1985 | Japan | G06F 11/28 |
| 3098123 | 4/1991 | Japan | G06F 9/44 |
| 3-209542 | 9/1991 | Japan | G06F 11/28 |
| 3209542 | 9/1991 | Japan | G06F 13/00 |
| 5066966 | 3/1993 | Japan | G06F 11/28 |

*Primary Examiner*—Dieu-Minh Le
*Attorney, Agent, or Firm*—Finnegan, Henderson, Farabow, Garrett & Dunner, L.L.P.

[57] ABSTRACT

An objective of the present invention to provide a system test support system and a system test support method which allows a developer to make a significant test even when the input contents are determined by a plurality of transitions. To achieve this objective, the present invention, by virtue of a software operation specification input, allows a developer to enter a software operation specification using a state transition model. A test sequence is then set up from transition sequence from a plurality of transition sequences and identification setting up feature, subsequently sets up the object identification to indicate the objects associated with the transition. Input items containing an operation that causes an event for each transition and operation targets which indicate the type of object on which the operation will be performed, are set up. The input contents determining feature determines the input contents for testing the test sequence, based on the object identifications and input items associated with a plurality of transitions in the test sequence. Finally, a test specification, complete with the input contents, is outputted by the outputting feature of the invention.

11 Claims, 27 Drawing Sheets

STATE TABLE

| ID | NAME | CENTRAL COORDINATES |
|----|------|---------------------|
| 1  | S1   | (x1, y1)            |
| 2  | S2   | (x2, y2)            |
| 3  | S3   | (x3, y3)            |
| .  | .    | .                   |
| .  | .    | .                   |
| .  | .    | .                   |

TRANSITION TABLE

| ID | EVENT | ACTION | START STATE | END STATE |
|----|-------|--------|-------------|-----------|
| 1  | e1    | a1     | 1           | 2         |
| 2  | e2    | —      | 2           | 3         |
| 3  | e3    | —      | 2           | 5         |
| .  | .     | .      | .           | .         |
| .  | .     | .      | .           | .         |
| .  | .     | .      | .           | .         |

FIG.3

SEQUENCE TABLE

| ID | SEQUENCE |
|---|---|
| 1 | (e1, a1, e2, e3, a3) |
| 2 | (e1, a1, e4, e6, a6) |
| . | . |
| . | . |
| . | . |
| . | . |

FIG.5

EVENT TABLE

| EVENT | OBJECT |
|---|---|
| e1 | CARD |
| e2 | PASSBOOK |
| e3 | CARD |
| e4 | CARD |
| e6 | CARD |
| . | . |
| . | . |

ACTION TABLE

| ACTION | OBJECT |
|---|---|
| a1 | PASSBOOK |
| a3 | COIN |
| a9 | CARD |
| . | . |
| . | . |
| . | . |
| . | . |

FIG.7

DEFINING OPERATIONS AND TARGETS ...

[EVENTS FOR CARDS]

| EVENT | OPERATION | TARGET |
|-------|-----------|--------|
| e1 | INSERT | UNDEFINED |
| e3 | — | NORMAL CARD |
| e4 | — | — |
| e6 | — | DAMAGED CARD |
| ...... | ...... | ...... |

FIG. 8

EVENT TABLE

| EVENT | OBJECT | OPERATION | TARGET |
|---|---|---|---|
| e1 | CARD | INSERT | UNDEFINED |
| e2 | PASSBOOK | INSERT | UNDEFINED |
| e3 | CARD | — — | NORMAL CARD |
| e4 | CARD | — — | — — |
| e6 | CARD | — — | DAMAGED CARD |
| . | . | . | . |
| . | . | . | . |

FIG.9

DEFINING SYMPTOMS ...

[EVENTS AND ACTIONS FOR CARDS]

| EVENTS AND ACTION | SYMPTOM |
|---|---|
| e1 | -- |
| e3 | -- |
| e4 | INSERT SLOT LAMP BLINKS |
| .. | -- |
| a9 | CARD IS EJECTED |
| ...... | ...... |

FIG. 10

EVENT TABLE

| EVENT | OBJECT | OPERATION | TARGET | SYMPTOM |
|---|---|---|---|---|
| e1 | CARD | INSERT | UNDEFINED | -- |
| e2 | PASSBOOK | INSERT | UNDEFINED | -- |
| e3 | CARD | -- | NORMAL CARD | -- |
| e4 | CARD | -- | -- | INSET SLOT LAMP BLINKS. |
| e6 | CARD | -- | DAMAGED CARD | -- |
| . | . | . | . | . |
| . | . | . | . | . |

ACTION TABLE

| ACTION | OBJECT | SYMPTOM |
|---|---|---|
| a1 | PASSBOOK | -- |
| a3 | COIN | DOOR OPENS |
| a9 | CARD | EJECTED |
| . | . | . |
| . | . | . |
| . | . | . |
| . | . | . |

FIG. 11

TEST SPECIFICATION TABLE

| ID | TEST FLOW |
|---|---|
| 1 | (OPERATION, PRESS [DRAWER] BUTTON)<br>(SYMPTOM, CARD INSERT SLOT LAMP BLINKS)<br>(SYMPTOM, INSERT PROMPT APPEARS)<br>(OPERATION, INSERT NORMAL CARD)<br>(SYMPTOM, PASSWORD ENTRY DISPLAY APPEARS) |
| 2 | (OPERATION, PRESS [DRAWER] BUTTON)<br>(SYMPTOM, CARD INSERT SLOT LAMP BLINKS)<br>(CONDITION, BEFORE INSERT PROMPT APPEARS)<br>(OPERATION, INSERT NORMAL CARD)<br>(SYMPTOM, PASSWORD ENTRY DISPLAY APPEARS) |
| 3 | (OPERATION, PRESS [DRAWER] BUTTON)<br>(SYMPTOM, CARD INSERT SLOT LAMP BLINKS)<br>(SYMPTOM, INSERT PROMPT APPEARS)<br>(OPERATION, INSERT DAMAGED CARD)<br>(SYMPTOM, CARD EJECTED) |
| ⋮ | ⋮ |

FIG. 24

| TEST ITEM 1 | | | | | |
|---|---|---|---|---|---|
| OPERATION | CHECK ITEM | ACCEPT/REJECT | DATE | YOUR NAME | REMARKS |
| PRESS [DRAWER] BUTTON | CARD INSERT SLOT LAMP BLINKS | | | | |
| INSERT NORMAL CARD | INSERT PROMP APPEARS | | | | |
| ... | PASSWORD ENTRY DISPLY APPEARS | | | | |
| | ... | | | | |

| TEST ITEM 2 | | | | | |
|---|---|---|---|---|---|
| OPERATION | CHECK ITEM | ACCEPT/REJECT | DATE | YOUR NAME | REMARKS |
| PRESS [DRAWER] BUTTON | CARD INSERT SLOT LAMP BLINKS | | | | |
| INSERT NORMAL CARD BEFORE PROMPT APPEARS | PASSWORD ENTRY DISPLY APPEARS | | | | |
| ... | ... | | | | |

| TEST ITEM 3 | | | | | |
|---|---|---|---|---|---|
| OPERATION | CHECK ITEM | ACCEPT/REJECT | DATE | YOUR NAME | REMARKS |

| TEST ITEM n | | | | | |
|---|---|---|---|---|---|
| OPERATION | CHECK ITEM | ACCEPT/REJECT | DATE | YOUR NAME | REMARKS |

FIG. 25

SYSTEM TEST SUPPORT SYSTEM AND SYSTEM TEST SUPPORT METHOD

BACKGROUND OF THE INVENTION

1. Field of the Invention

This invention relates to a system test support system and a system test support method which efficiently support the test of software by creating and outputting test specifications.

2. Description of the Prior Art

Today, a variety of computer software products are being developed. The operation of some of these software products—for example, microcomputer-implemented control software products—is based on the principle: "reacting to an external event and taking an appropriate action."

One of software (system) description models designed around this principle is a state transition model. A state transition model represents the whole system operation as follows: "The model stores the current state and, when an event occurs, Lakes an appropriate action and updates the current state accordingly."

Therefore, in many cases, the operation specification of a control software product is described using a state transition model. A state transition diagram or a state transition table are popular ways to describe a state transition model. Describing an operation specification using these description methods makes the resulting specification easier to understand and more precise than in a natural language. In the rest of this specification, a state transition diagram is used to explain this invention; however, a state transition model according to this invention is not restricted to a specific form of table or diagram.

Formal representation of a state transition model allows the user to develop a technique to combine program parts, making it possible to generate source code automatically. Generating source code without human intervention ensures that the code will run exactly as described by the state transition model and, at the same time, enhances development productivity.

Other techniques have also been provided to help the user verify that there is no errors in an operation specification. For example, the description is syntactically checked, an emulator is used to simulate the operation to check that there is no error, and a simulator is provided for the designer to confirm the operation.

That is, for an operation specification represented by a state transition model, there have been support techniques to verify that there is no error in the operation specification and to generate automatically the source code that is ensured to operate as described in the operation specification.

However, when developing a software product, the whole product is not always developed in one module. This means that the link test of the modules is necessary. This test is made to check the compatibility of the interface between modules after each module (part) of the product is tested to work correctly.

For a software product that is built into a hardware unit, the software system test is made to confirm that the software product is compatible with the hardware unit.

Thus, even for a software product developed using a state transition model, various software tests, such as the link test and software system test, must be done. And, usually, before a test is made, a test specification must be prepared; this is a time-consuming, complicated job which requires experience and in-depth knowledge.

Techniques for helping the user prepare test specifications include: a technique for extracting from a state transition diagram a sequence of items to be tested, a technique for extracting some items on which operation can be performed externally, and a technique for determining data for use in the operations that are performed externally. The following details these techniques:

(1) Building a test sequence

The test items in an operation specification, represented by a state transition diagram, may be associated with a series of events that occur and actions that are performed as state transition occurs. This series is called a sequence. The following techniques are available for extracting this sequence:

Builds sequences by examining the operation specification. This is done by the developer.

Automatically extracts all the possible sequences for event-action combinations and for the sequence in which they occur. (Japanese Non-Examined Patent Publication No. 60-77248)

Automatically extracts as few sequences as possible while still meeting the condition that each transition state is examined at least once. (Japanese Non-Examined Patent Publication No. 03-98123)

Automatically extracts sequences with emphasis on some particular transition states (Japanese Non-Examined Patent Publication No. 59-151248)

(2) Preparing a test specification (Japanese Non-Examined Patent Publication No. 5-66966)

There are two types of events in a test sequence: external events and internal events. An external event may be caused outside a program to be tested, while an internal event occurs inside a program to be tested and therefore cannot be controlled externally. When we test a program, we cause only external events sequentially. Therefore, there is a technique for dividing the events into internal events and external events and for extracting only external events from them for use in a test specification.

(3) Creating test data (Japanese Non-Examined Patent Publication No. 3-209542)

Making a test requires data for causing events in a sequence. To meet this need, there is a technique for associating data with each event in order to generate data for input to a sequence.

However, the prior art has the following problems:

(1) First, it is impossible to create test data for use in a situation where the system operation changes according to a combined operation of a plurality of events, for example, in a situation where the system operation changes according to whether or not an element is normal.

FIG. 26 shows an example of state transition diagram. A circle indicates a state, an arrow indicates a transition, a character string before the slash indicates an event, and a character string after the slash indicates an action.

FIG. 26 is an example of a state transition diagram showing a part of a card feeder operation specification. When the feeder receives the event "card detected" while in the "wait for card" state, it executes "feed card" and moves to the "card being fed" state.

Assume that data is supplied to the event "card detected" using the prior art described in "Creating test data". When a software system is tested, this data may be an operator action. That is, the operator performs the "insert card" operation.

Also assume that the feeder can judge whether the card is normal or not only after it reads the card completely. If the "card feed complete (normal card)" event occurs while the feeder is in the "card being fed" state, then the inserted card is normal. On the other hand, if the "card feed complete (abnormal card)" event occurs, then the card is abnormal, for example, it is damaged. That is, if we want to test either the transition sequence of a normal card or the transition sequence of an abnormal card, we cannot determine the cards to be tested only from the event "card detected."

Thus, in a situation where data for an event cannot be determined only from the event but must be determined by considering other associated events as well, it is impossible for the prior art to create appropriate test data.

(2) The prior art cannot extract symptoms that must be checked against input data. In a test, test data is supplied sequentially to the software to be tested and the resulting symptoms are checked, This means that a test specification should specify how to generate input data and, in addition, extract symptoms to be checked. However, a technique for extracting symptoms to be checked has not been known.

(3) According to the prior art, a test specification considering operation timings (for example, the system operation changes according to operation timings) cannot be prepared. FIG. 27 is a diagram showing an example of a part of state transition of a coin counter which counts the number of coins when a coin is inserted.

This diagram shows that the system is ready in the "state 1" state. When the "ready" event occurs, the system executes the "drop coin prompt screen display" action and moves to the "state 2" state. When the "drop coin" event occurs, the system executes the "count counts" action, erases the screen, and moves to the "state 3" state. This is a typical flow. This sequence is called "sequence A."

On the other hand, when the user drops a coin before the system enters the "state 1" state, the "drop coin" event occurs and the system moves to the "state 4." After that, when the system becomes ready, the "ready" event occurs; then, the system executes the "count coins" action and moves to the "state 3" state. This sequence is called "sequence B." Note that, in sequence B, the system does not execute the "drop coin prompt screen display" action.

Consider that the technique described in "Preparing a test specification" is applied to this system. In this case, the "drop coin" event is an external event, and the "ready" event is an internal event. Then, sequence A and sequence B, which are represented only by the external event "drop coin", are same test item. Depending upon the timing in which a coin is dropped, sequence A or sequence B is executed.

In such a case, if sequence A is used when setting symptoms to be checked in the test specification and if sequence B is executed in an actual test, the "drop coin prompt screen display" event is skipped, resulting in an incorrect test result. However, in reality, the description in the operation specification is not incorrect. This decreases the reliability of the test result.

In addition, which sequence (sequence A or sequence B) is to be used may be controlled by checking symptoms. If this is described in the test specification, the test efficiency will increase. That is, when the user drops a coin before the "drop coin prompt screen display" event is executed, sequence B is executed; when the user drops a coin after the display, sequence A is executed. A technique for creating this type of test specification in which data input timing is considered has long been awaited.

This invention seeks to solve the problems associated with a prior art described above. It is an object of this invention is to provide a system test support system and a system test support method which can executes a significant test even when input data is based on a plurality of transitions.

It is another object of this invention to provide a system test support system and a system test support method which produces symptoms to be checked in each test sequence.

It is also another object of this invention to provide a system test support system and a system test support method which can make a significant test even when the system operation depends on data input conditions such as data input timings.

It is still another object of this invention to provide a simply-structured system test support system and a system test support method.

SUMMARY OF THE INVENTION

To achieve the object, the invention is a system test support system comprising: an operation specification inputting means for entering a transition state model, representing a software system operation specification, in a state transition model composed of a plurality of transitions each including events and actions; a test sequence setting means for setting up a test sequence to be tested which is one of transition sequences each consisting of a series of said transitions; an identification setting means for setting up the object identifications indicating the objects associated with a transition; an input item setting means for setting up an input item containing an operation which causes an event for said transition and an object target which indicates the type of said object on which the operation is to be performed; an input contents determining means for determining input contents containing operation, object identification and operation objects for testing said test sequence, based on said object identification and said input item associated with a plurality of transitions in said test sequence; and an outputting means for outputting a test specification including said input contents.

From a methodological standpoint, the invention comprises an operation specification inputting step for entering a transition state model, representing a software system operation specification, in a state transition model composed of a plurality of transitions each including events and actions; a test sequence setting step for setting up a test sequence to be tested which is one of transition sequences each consisting of a series of said transitions; an identification setting step for setting up the object identifications indicating the objects associated with a transition; an input item setting step for setting up an input item containing an operation which causes an event for said transition and an object target which indicates the type of said object on which the operation is to be performed; an input contents determining step for determining input contents containing operation, object identification and operation objects for testing said test sequence, based on said object identification and said input item associated with a plurality of transitions in said test sequence; and an outputting step for outputting a test specification including said input contents.

According to another aspect of the invention, a system test support method comprises an operation specification inputting step for entering a transition state model, representing a software system operation specification, in a state transition model composed of a plurality of transitions each including events and actions; a test sequence setting step for setting up a test sequence to be tested which is one of transition sequences each consisting of a series of said transitions; an identification setting step for setting up the object identifications indicating the objects associated with a transition; an input item setting step for setting up an input item containing an operation which causes an event for said transition and an object target which indicates the type of said object on which the operation is to be performed; an input contents determining step for determining input contents containing operation, object identification and operation objects for testing said test sequence, based on said object identification and said input item associated with a plurality of transitions in said test sequence; and an outputting step for outputting a test specification including said input contents.

As a feature of the present invention, the input contents are determined by a plurality of transitions. For example, if an operation and an object are determined by a transition in the test sequence and if an operation target, which is a restricted object in the sequence, is determined by some other transition, not only the operation and object but also the operation target is determined as the input contents based on both transitions. A significant test may be done on a sequence, which is associated with a specific operation target, because the input contents which include not only an operation and object but also an operation target are determined and output. Therefore, this invention makes it possible to make a significant test even if the input contents are determined according to a plurality of transitions.

A criterion on which test sequence selection is based or a criterion on which operation target selection from a plurality of transitions is based may be implemented in any form. For example, the most restrictive operation object need not be used when a plurality of sequences are set up into a single sequence or when a test on some specific sequence such as that for exception processing is omitted.

According to a further feature of the invention, input contents determination uses the most restrictive operation object in said test sequence as said operation object contained in said input contents.

According to another feature of the invention, the operation target, a component of the input contents, is selected according to the level of restriction which is a simple and fixed criterion, a test specification for a specific sequence can be obtained speedily and in a simple configuration.

In another aspect of the invention, of the system test support system further comprises: an output item setting means for setting up an externally visible output item caused by said transition; and an output contents determining means for determining output contents indicating a symptom to be checked with respect to said input contents for said test sequence based on said input contents and said output item, wherein said outputting means outputs a test specification containing the output contents.

From a methodological standpoint, the system test support method, further comprises: an output item setting step for setting up an externally visible output item caused by said transition; and an output contents determining step for determining output contents indicating a symptom to be checked with respect to said input contents for said test sequence based on said input contents and said output item, wherein said outputting step outputs a test specification containing the output contents.

As a feature of the invention the symptoms to be confirmed for each test sequence also help the developer make a system test efficiently. The output contents, consisting of the input contents and output items, further increase test reliability.

According to another aspect of the invention, the system test support system further comprises an input condition determining means for determining input conditions for entering said input item in said test sequence based on said operation specification, said output item, and said output contents, wherein said outputting means outputs said test specification containing determined input conditions.

From a methodological standpoint,the test support method of the invention further comprises an input condition determining step for determining input conditions for entering said input item in said test sequence based on said operation specification, said output item, and said output contents, wherein said outputting step outputs said test specification containing determined input conditions.

According to a feature of the invention, the input conditions are output in a test specification. This allows a significant test to be made even if the system operation differs according to the input condition such as an input timing.

An additional feature of the invention, the input condition determining means detects a state where there is a possibility that both a transition which is caused by an operation and a transition which is not caused by an operation but which causes a symptom may occur and which determines the symptom as an input condition for the operation.

From a methodological standpoint the input condition determining step of the system test support method detects a state where there is a possibility that both a transition which is caused by an operation and a transition which is not caused by an operation but which causes a symptom may occur and which determines the symptom as an input condition for the operation.

Furthermore, a plurality of transition sequences created by input conditions, such as an input timing of operation, are detected according to a simple, fixed criterion. This is a state where there is a possibility that both a transition which is caused by an operation and a transition which is not caused by an operation but which causes a symptom may occur. In this case, the transition sequence varies according to whether an operation is performed immediately in the state or an operation is performed after confirming a symptom. And, according to the inventions as claimed, a message is output to inform that the transition sequence depends on which should be confirmed first, operation or symptom. Or, two test specifications are produced: one for instructions for an operation after confirming a symptom and the other for instructions for an operation before confirming a symptom.

Other and further objects, features and advantages of the invention will appear more fully from the following description.

BRIEF DESCRIPTION OF THE DRAWINGS

FIG. 3 is a diagram showing an example of operation specification data structure used in the system test support system used in the embodiment of this invention.

FIG. 5 is a diagram showing an example of a test sequence data structure in the system test support system used in the embodiment of this invention.

FIG. 7 is a diagram showing an example of an object identification data structure in the system test support system used in the embodiment of this invention.

FIG. 8 is a diagram showing an example of a screen where the input item setting means is implemented in the system test support system used in the embodiment of this invention.

FIG. 9 is a diagram showing an example of an input item data structure in the system test support system used in the embodiment of this invention.

FIG. 10 is a diagram showing an example of a screen where the output item setting means is implemented in the system test support system used in the embodiment of this invention.

FIG. 11 is a diagram showing an example of an output item data structure in the system test support system used in the embodiment of this invention.

FIG. 24 is a diagram showing an example of a test specification (test specification table) in the system test support system used in the embodiment of this invention.

FIG. 25 is a diagram showing an example of printed test items in the system test support system used in the embodiment of this invention.

SYMBOLS

Figure 1:
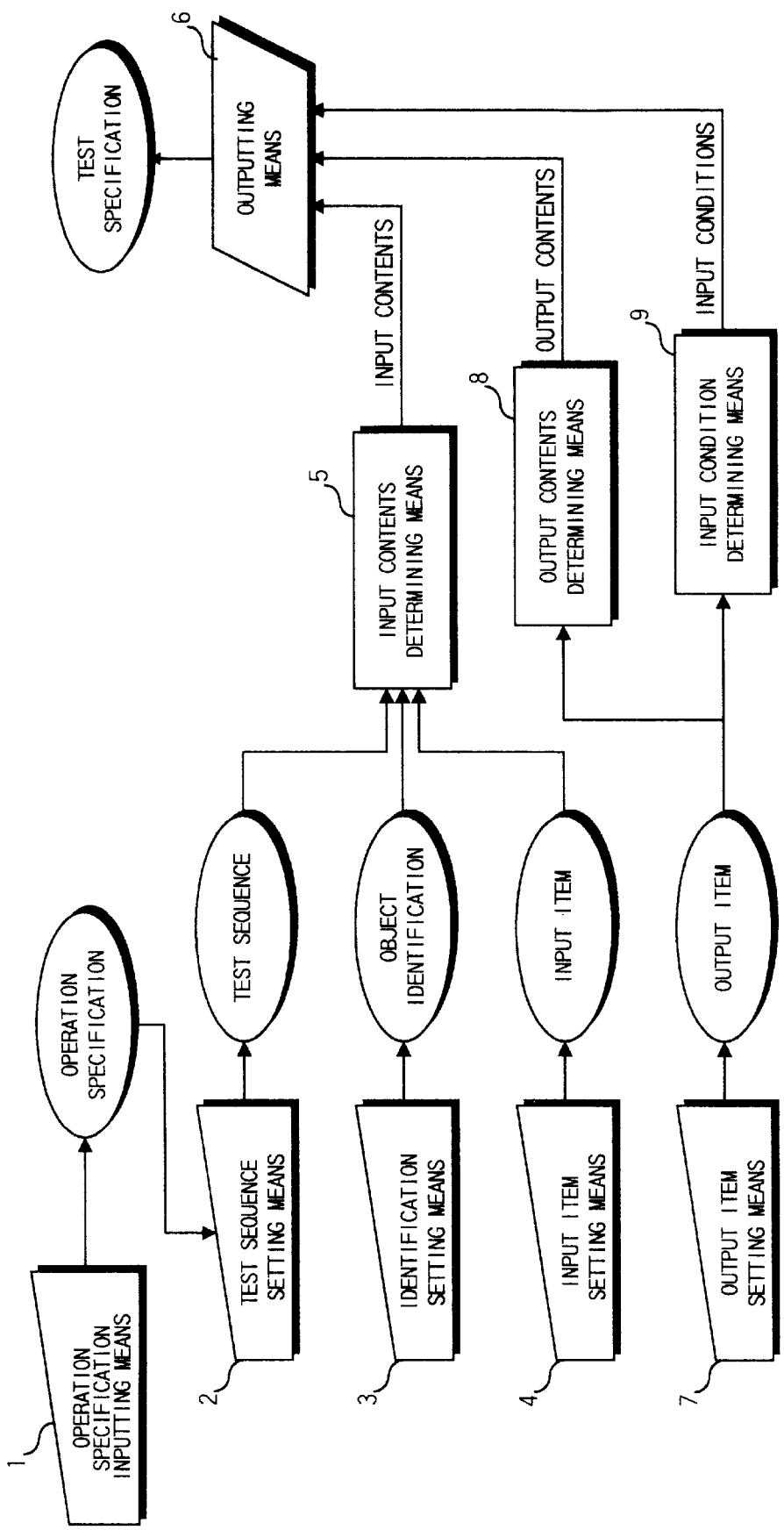
FIG. 1 is a functional block diagram showing the configuration of the system test support system used in the embodiment of this invention.

1: Operation specification inputting means
2: Test sequence setting means
3: Identification setting means
4: Input item setting means
5: Input contents determining means
6: Outputting means
7: Output item setting means
8: Output contents determining means
9: Input condition determining means
STEP: A step in a procedure
E, E-A, E2, I, O, P, Ps, S: Temporary storage areas

DETAILED DESCRIPTION

Referring to the attached drawings, there is shown a preferred embodiment of this invention.

(1) Configuration of the Embodiment

It is an object of this invention is to provide a system test support system and a system test support method which can execute a significant test even when input data is based on a plurality of transitions. It is another object of this invention to provide a system test support system and a system test support method which can produce symptoms to be checked in each test sequence.

It is also another object of this invention to provide a system test support system and a system test support method which can make a significant test even when the system operation depends on data input conditions such as data input timings. It is still another object of this invention to provide a simply-structured system test support system and a system test support method.

FIG. 1 is a functional block diagram showing the configuration of the system test support system used in this embodiment. As shown in this figure, the system test support system used in this embodiment has the operation specification inputting means 1 which allows the user to enter a state transition model representing the operation specification of a software system in the form of transitions consisting of events and actions, the test sequence setting means 2 which selects a test sequence to be tested from a plurality of sequences each consisting of transitions, the identification setting means 3 which sets up the object identification of an object (both event and action) associated with a transition, and the input item setting means 4 which creates an input item consisting of an operation which causes an event and an operation object indicating the type of an object on which the operation is to be performed.

The system test support system used in this embodiment also has the input contents determining means 5 which determines the input contents, composed of an operation, object identification, and operation target for testing a test sequence based on the object identification and input items associated with a plurality of transitions in the test sequence as well as the outputting means 6 which outputs a test specification containing the input contents.

The system test support system in this embodiment also has the output item setting means 7 which sets up externally-visible symptoms caused by the transitions in a sequence and the output contents determining means 8 which determines the output contents to be confirmed for the input contents of each test sequence based on the input contents and output items. In addition, the system test support system in this embodiment has the input condition determining means 9 which determines the input conditions for input from each test sequence based on the operation specifications, output items, and output contents.

(2) Operation and Effects of the Embodiment

This embodiment with the above configuration operates as follows:

Steps for Entering an Operation Specification

Figure 2:
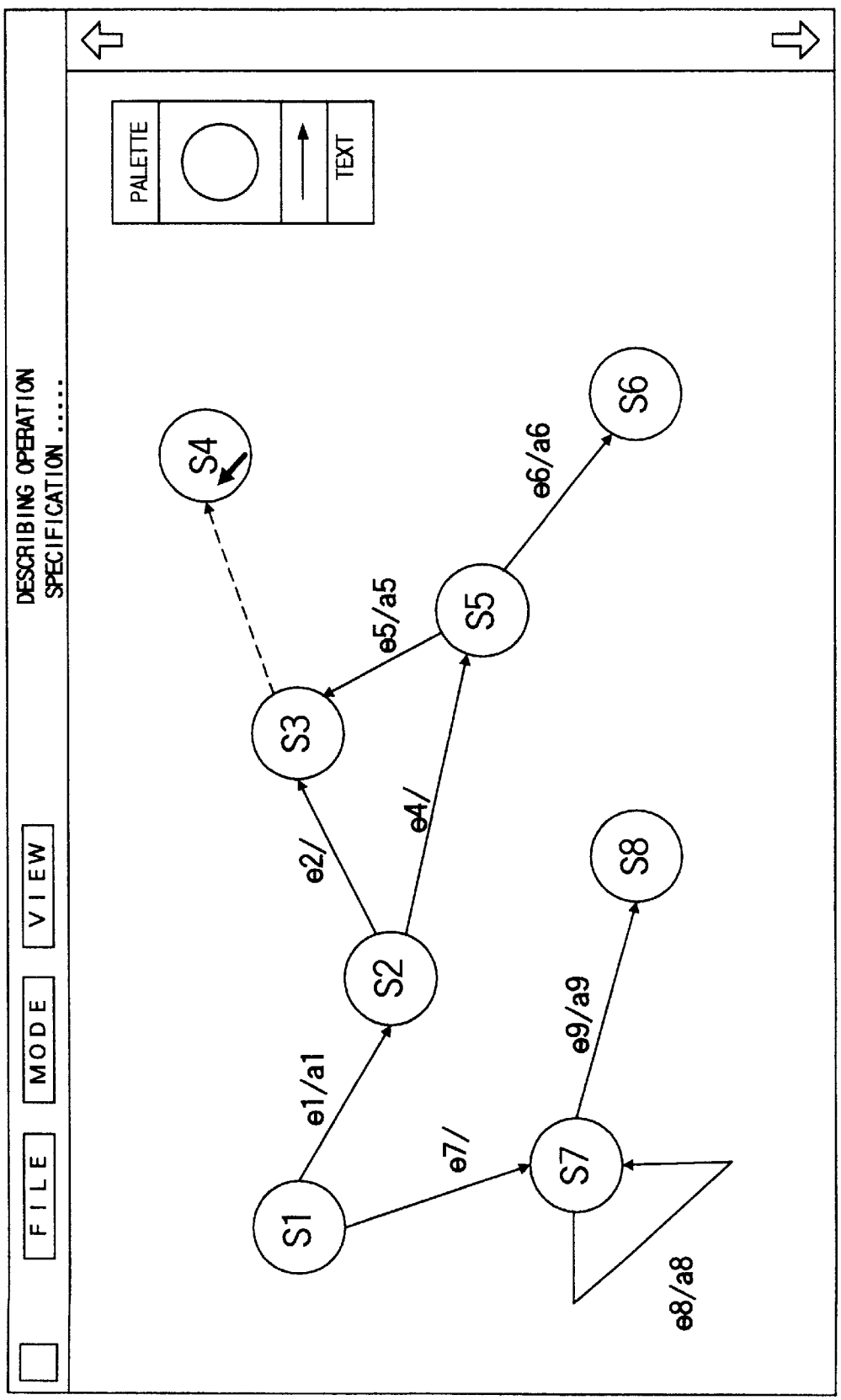
FIG. 2 is an example of an input screen when a specifically-designed editor is used as the operation specification inputting means 1 to describe a state transition diagram in the system test support system used in the embodiment of this invention.

First, a developer uses the operation specification inputting means 1 to enter a state transition model representing a software system operation specification in the form of transitions which include events and actions. FIG. 2 is an example of display on the input screen which is created with an editor specifically designed for describing a state transition diagram. The screen is in the "operation specification description" mode (that is, operation descriptions may be accepted). On this screen, an arc from state "S3" to state "S4" is being drawn with an arrow (indicating a transition in the state transition diagram) which has been selected from the palette as an drawing item (where all the items for setting up graphic items are displayed). A software operation specification described in this manner is stored in the storing means which is, for example, an area allocated in memory.

FIG. 3 shows an example of the operation specification table structure. This data structure consists of two tables: state table and transition table. The state table contains all the states, each with its identification (ID), name, and central coordinates on the screen.

The transition table contains all the transitions, each with its identification (ID), event name, and action name. In the transition table, an event name and an action name are used as identifiers. The table also contains the state ID of the "start state" which is the source of a transition and the state ID of the "end state" which is the destination of a transition. These entries indicate where each transition starts and ends, what event causes the transition, and what action is done at that time.

Steps for Setting up a Test Sequence

Next, the developer uses the test sequence setting means 2 to select a test sequence to be tested from a plurality of sequences, each of which is a series of transitions. Here, any of the methods described in "Building a test sequence" may be used. That is, a test sequence may be set up by the developer or automatically by the sequence selection algorithm.

Figure 4:
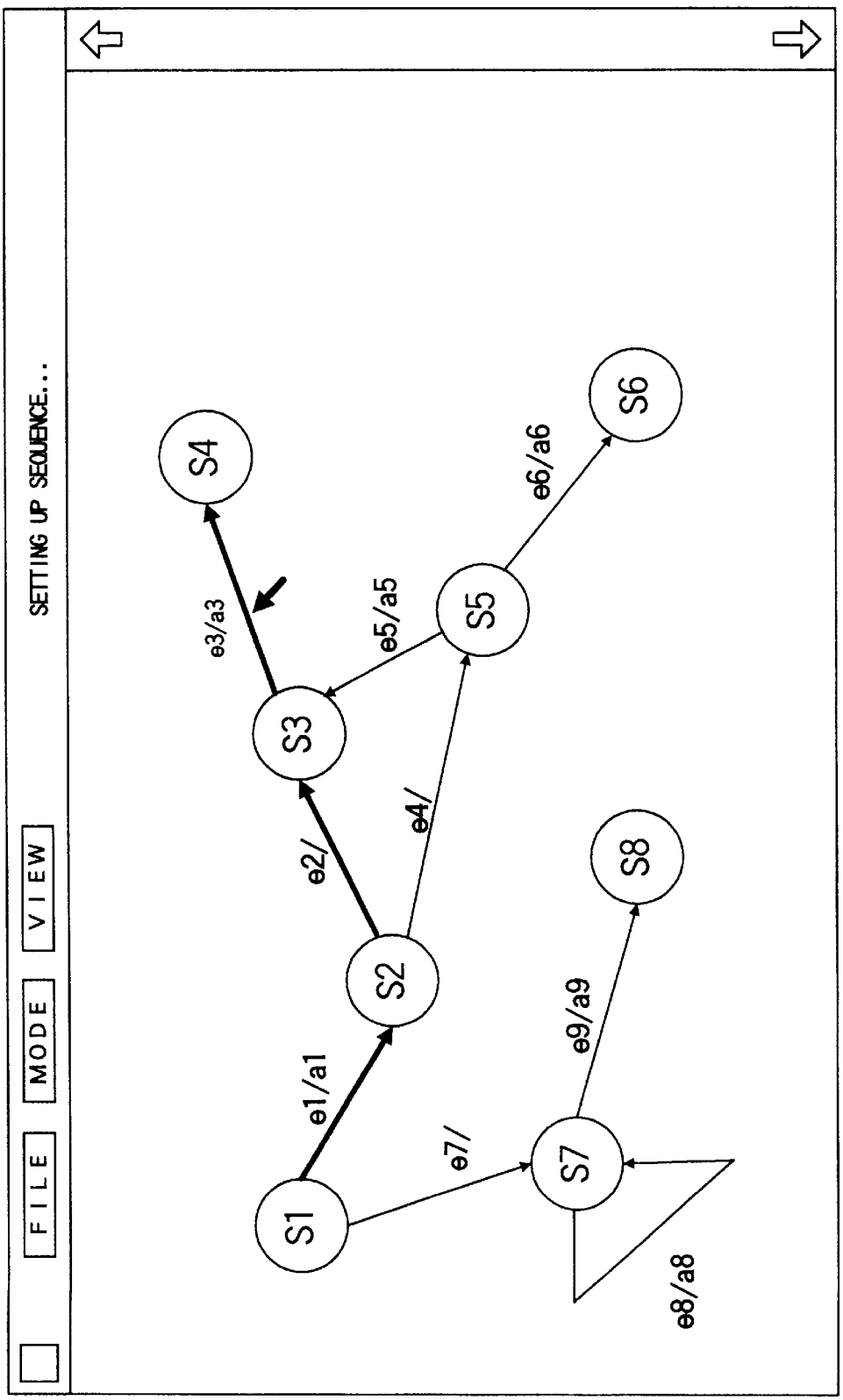
FIG. 4 is a diagram showing an example of a screen where a developer specifies a test sequence while referencing an operation specification in the system test support system used in the embodiment of this invention.

FIG. 4 is an example of screen display where the developer is setting up a test sequence while referencing the operation specification. On this screen, the test sequence setting means 2 is implemented as a function of the editor shown in FIG. 2. The screen is now in the "sequence setup" mode. The user is now specifying transitions from "S1 to S2", "S2 to S3", and "S3 to S4." In this way, the user specifies a sequence, consisting of plurality of transitions, as a test sequence.

A test sequence set up in this manner is stored in the storing means which is, for example, an area allocated in memory. FIG. 5 shows an example of a data structure containing test sequences. This data structure is a table consisting of sequences, each having an identification number (ID) and a series of sequentially-arranged events and actions contained in the sequence. Out of these sequences, ID1 is a sequence set up in FIG. 4 above.

Steps for Setting up Objects

Next, the developer uses the identification setting means 3 to specify the identifications of the objects associated with each transition (related events and actions). This may be set only for the test sequence or for all the sequences contained in the operation specification. Note that objects must be set up for each hardware unit, operation target, and symptom that are controlled by the software. Take an automatic teller machine (ATM) for example. The objects of an ATM include cards (cash card), passbooks, coins, bills, screen.

Figure 6:
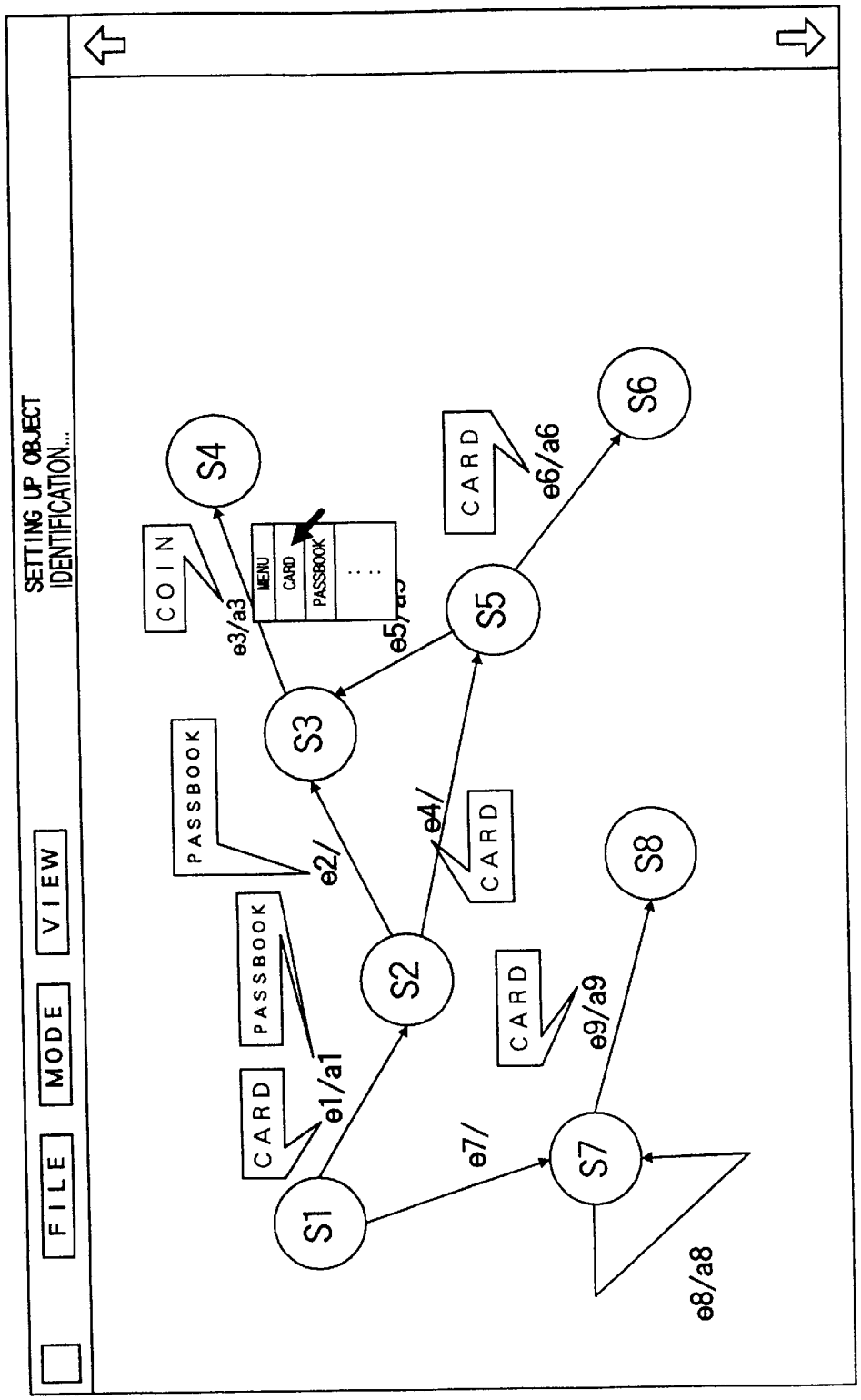
FIG. 6 is a diagram showing an example of a screen where the identification setting means is implemented as a function of the editor, shown in FIG. 2, in the system test support system used in the embodiment of this invention.

FIG. 6 is an example of display on the screen where the identification setting means 3 is implemented as a function of the editor shown in FIG. 2. On this screen, the user is selecting, with the use of the mouse, an object from the menu for each event and action while referencing the software operation specification. FIG. 6 shows that the user is specifying a card for event e3 as the object identification. Events e1, e4, e6, and e9 have already been set to "card", event e2 and action a1 to "passbook", and action a3 to "coin", respectively.

Object identifications set up in this manner are stored in the storing means which is, for example, an area allocated in memory. FIG. 7 shows an example of data structure containing object identifications. This structure contains the event table which contains the correspondence between events and objects and the action table which contains the correspondence between actions and objects. FIG. 7 shows the object identifications set up in FIG. 6.

Steps for Setting up Input Items

Next, the developer uses the input item setting means 4 to specify an input item consisting of the following two: an operation which causes an event on a transition and an operation target representing the type of object on which the operation is to be performed. The events of the state transitions described in the software operation specification contains events that can be caused externally (external events). And, processing that is performed externally to cause an external event is called an "operation."

An "operation" is performed on a special object such as a "card", and the type of an operation target (hereafter called "target") is sometimes identified by an object type such as a "normal card." These operations and targets are collectively called "input items." For example, in an input item "insert a normal card", the operation is "insert" and the target is "a normal card."

FIG. 8 shows an example of a screen used by the input item setting means. On this screen, the developer is creating input items for events whose object identifications are cards. For event e1, the operation is "inserts" and the target is undefined. This means that the operation target is not yet defined at the time the operation "insert" is performed.

For event e3, no operation is specified because this event is not an external event. And, because the operation target can be identified as a "normal card" at the time the event occurs, a "normal card" is specified for the target. Input items set up in this manner are stored in the storing means which is, for example, an area allocated in memory. Input items may be set only for the test sequence or for all the sequences contained in the operation specification.

FIG. 9 shows an example of a data structure containing input items. This data structure is an extension of the event table shown in FIG. 7. That is, the operation field and the target field have been added to the table in FIG. 7 which is composed only of the event field and the object identification field. Another technique to identify an object is to establish a special naming rule for events and actions. For example, a rule which requires that an event name or an action name be preceded by the reserved word "CARD" may be used to identify an object associated with the event or action.

Steps for Setting up Output Items

Next, the developer uses the output item setting means 7 to specify output items which are externally-visible symptoms caused by the transitions in a sequence. These symptoms are caused by events or actions associated with state transitions. These may be set only for the test sequence or for all the sequences contained in the operation specification.

FIG. 10 shows an example of a screen used by the output item setting means. On this screen, symptoms for the events and actions for cards are specified. For example, this screen shows that the card insert slot lamp blinks when event e4 occurs and that a card is ejected when action a9 is executed.

Output items set up in this manner are stored in the storing means which is, for example, an area allocated in memory. FIG. 11 shows an example of a data structure containing output items. This data structure is composed of an event table and an action table. The event table is an extension of the event table shown in FIG. 9, while the action table is an extension of the action table shown in FIG. 7.

The input of an operation specification, the specification of a test sequence, the specification of object identifications, the specification of input items, and the specification of output items may be done in any order, except that the operation specification must be specified before the test sequence.

Steps for Determining Input Contents

After the input and the specification described above are finished, the input contents determining means 5 determines the input contents consisting of operation/object identifications and operation targets for use in testing the test sequence, based on the object identifications and input items of the objects associated with a plurality of transitions in the test sequence.

For example, take the sequence "e1, a1, e2, e3, a3" in FIG. 5 as an example. The first line (line for e1) of the event table in FIG. 9, which contains input items, shows that a card must be inserted to cause event e1. By following this sequence, e3 is found. This means that, from the line in the event table where e3 is specified, the card that is inserted must be a "normal card." Therefore, this analysis indicates that the first input of this sequence is "insert a normal card."

Figure 12:
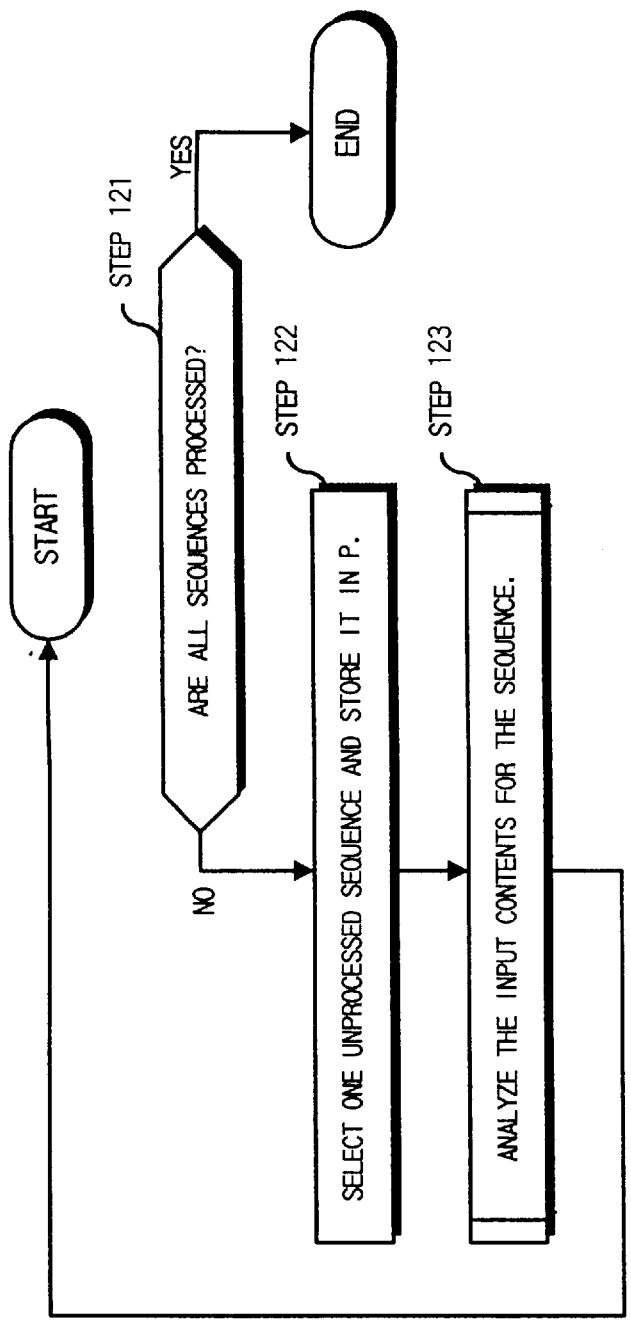
FIG. 12 is a flowchart showing the steps for determining the input contents in the system test support system used in the embodiment of this invention.
Figure 13:
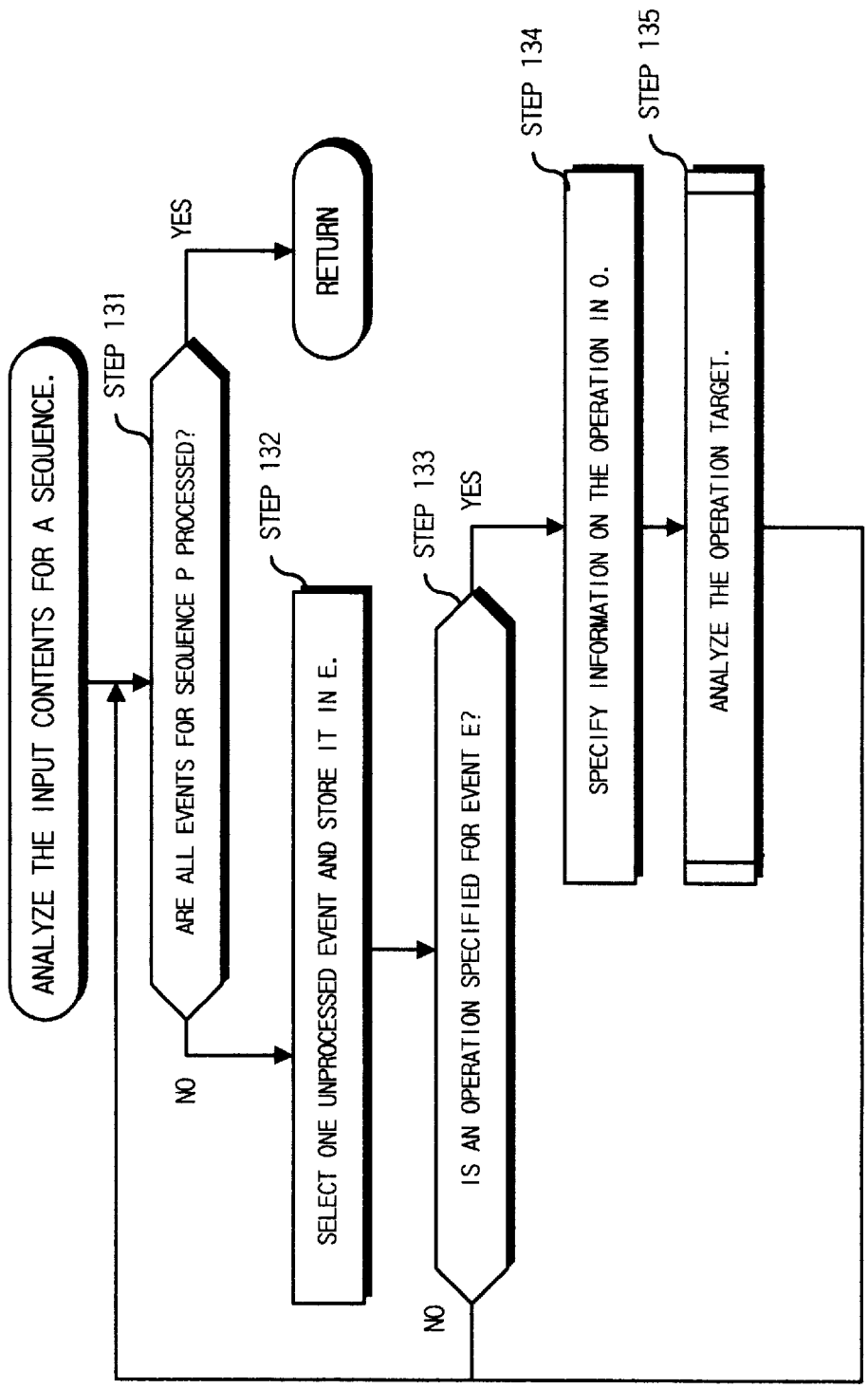
FIG. 13 is a flowchart showing the steps for analyzing the input contents (STEP 123) in the system test support system used in the embodiment of this invention.
Figure 14:
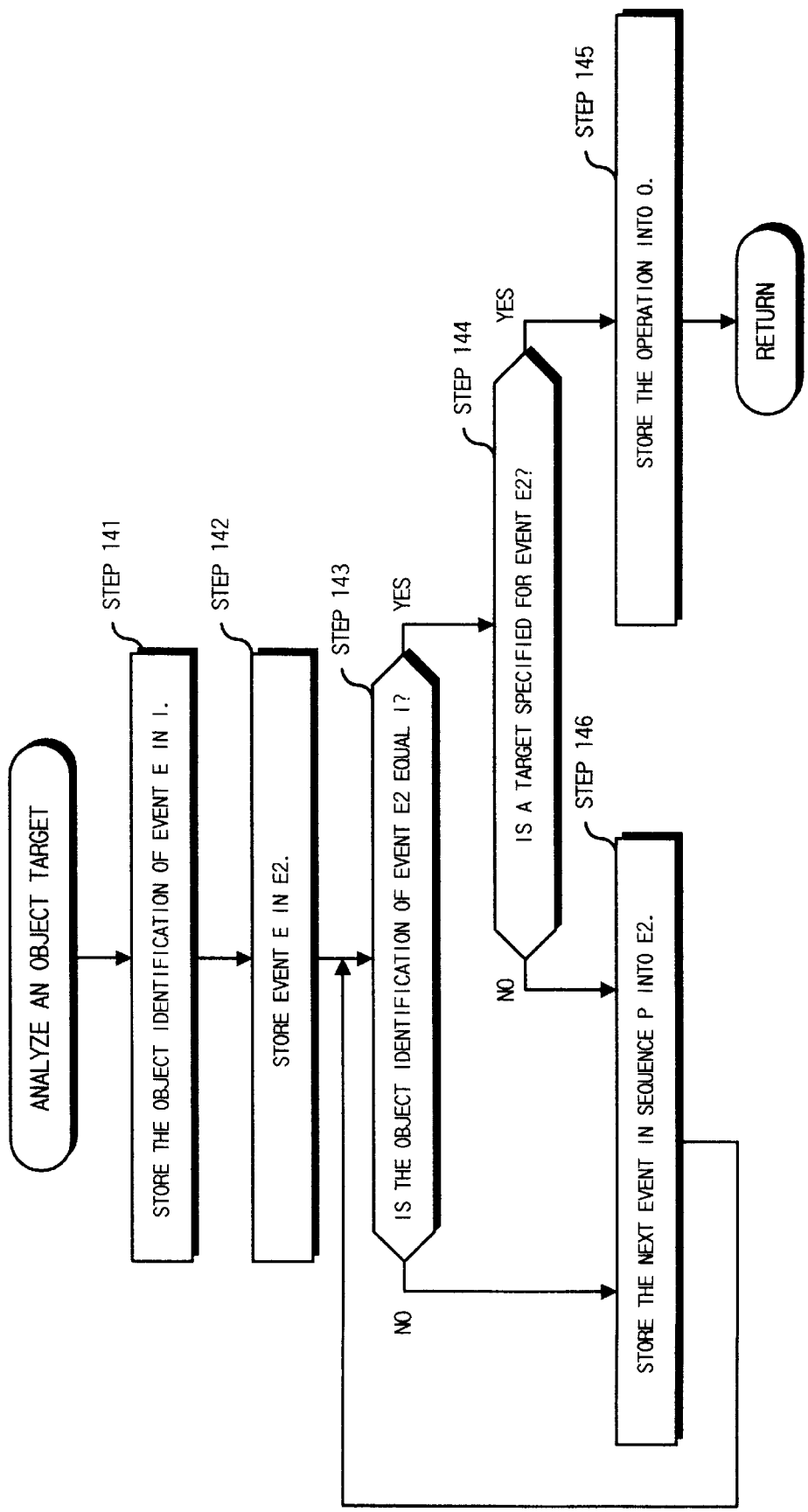
FIG. 14 is a flowchart showing the steps for analyzing operation targets (STEP 135) in the system test support system used in the embodiment of this invention.
Figure 15:
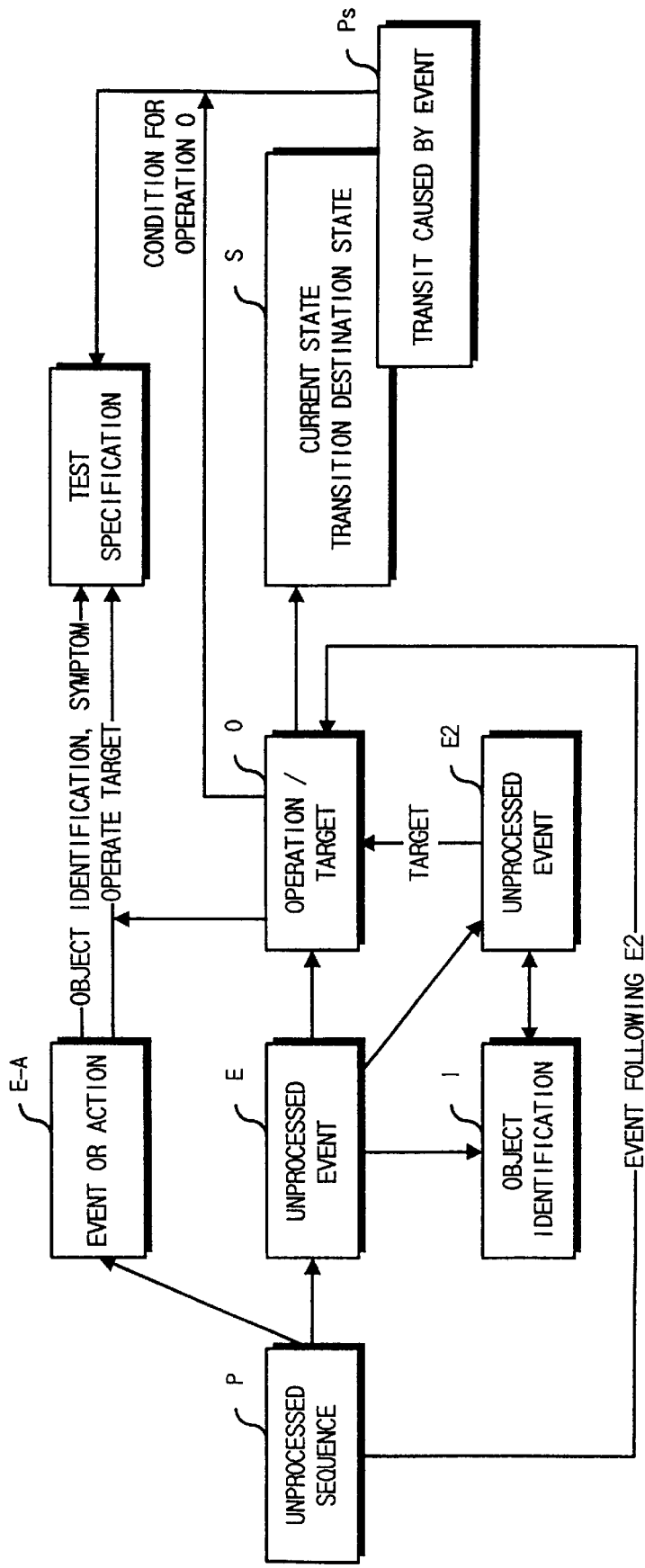
FIG. 15 is a diagram showing the temporary storage areas used in the description of the system test support system used in the embodiment of this invention.

FIGS. 12, 13, and 14 are flowcharts showing the procedures for determining the input contents. In the flowchart shown in FIG. 12, unprocessed sequences are selected, one at a time, and are stored in the temporary storage area P (step 122) until all the test sequences are processed (step 121). Here, a sequence stored in the temporary storage area P is called sequence P. Also, in the following discussion, an item indicating an event (E), action (A), or operation (O) is represented by the symbol of the area where it is stored. The input contents for sequence P are determined through analysis (step 123), and control returns to step 121.

FIG. 13 is a flowchart showing the steps for input contents analysis (step 123). The system selects unprocessed events, one at a time, and stores it in the temporary storage E (step 132) until all the events in sequence P are processed (step 131). When an operation is specified for event E (step 133), the system stores this operation in the temporary storage O (step 134), identifies the operation target (step 135) through analysis, then returns control to step 131.

FIG. 14 is a flowchart showing the steps for analyzing operation target (step 135). That is, the system checks the object identification of event E and stores it in the temporary storage I (step 141), and stores event E in temporary storage E2 (step 142). If the object identification of event E2 equals I (step 143) and if a target is specified for event E2 (step 144), the system stores the target into the temporary storage O (step 145); otherwise, the system stores the event which comes after E2 in sequence P, into E2 (step 146) and returns control to step 143.

This procedure associates an object, which corresponds to an operation in the sequence, with an object. Here, an operation target used in the input contents should be the most restrictive one in the test sequence. This enables an operation target used in the input contents to be selected according to a simple, fixed criterion, allowing a test specification for a specific sequence to be obtained speedily in a simple configuration. There are several methods of detecting the most restrictive operation target. For example, a long description may be determined as most restrictive or information such as dictionary data may be prepared in advance.

Figure 16:
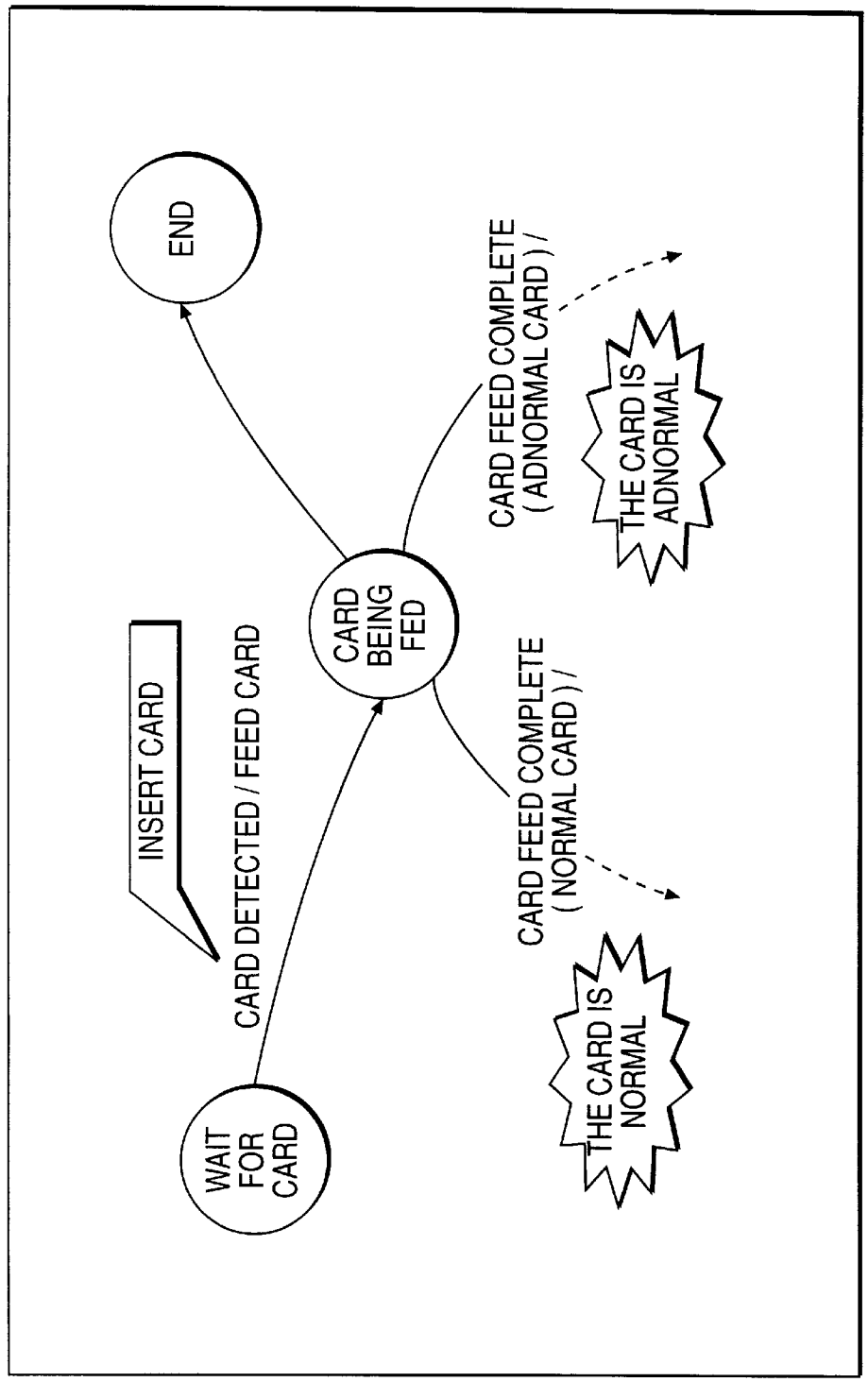
FIG. 16 is a diagram showing another example of a specification description in the system test support system used in the embodiment of this invention.
Figure 17:
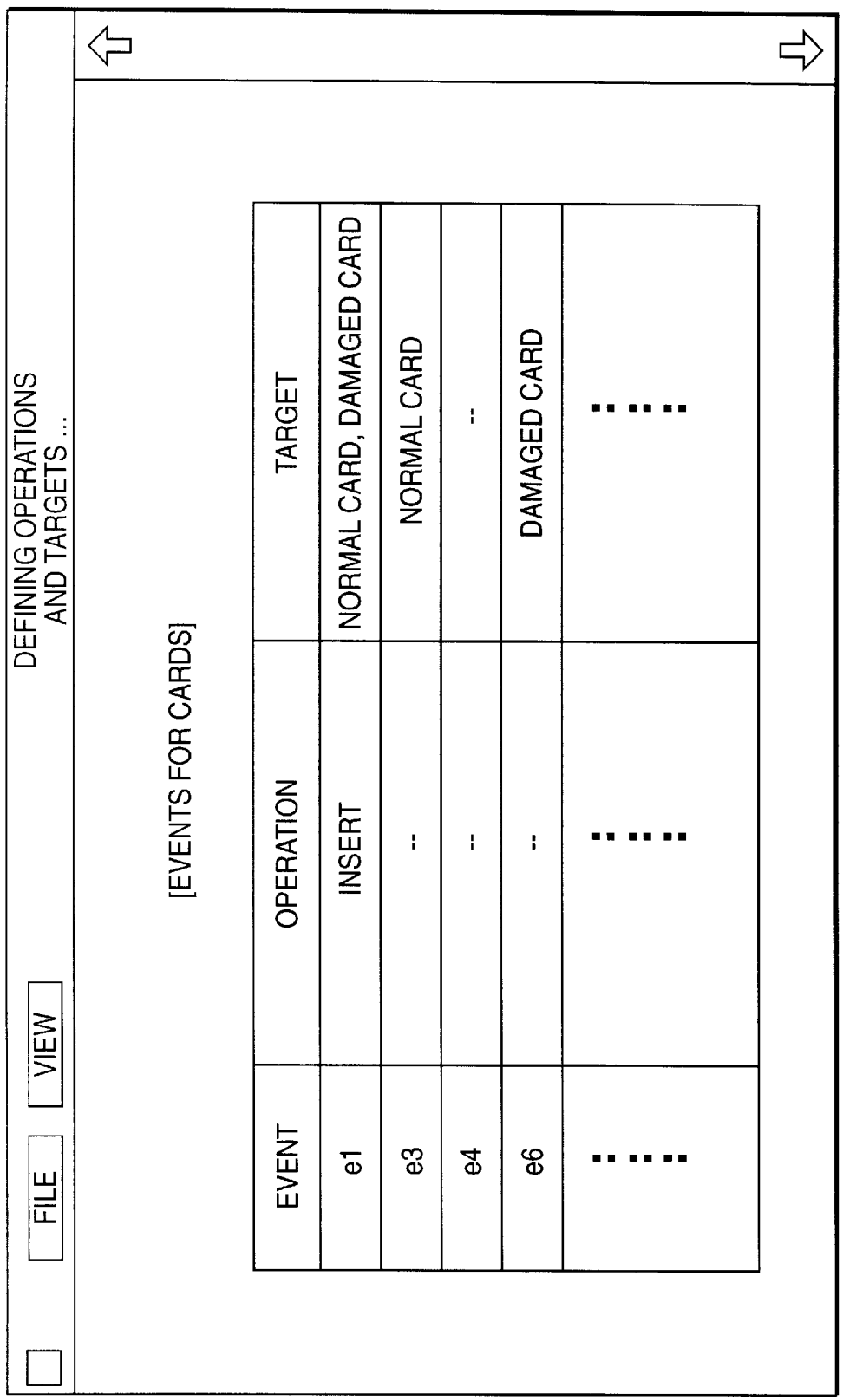
FIG. 17 is a diagram showing another example of input items in the system test support system used in the embodiment of this invention.
Figure 26:
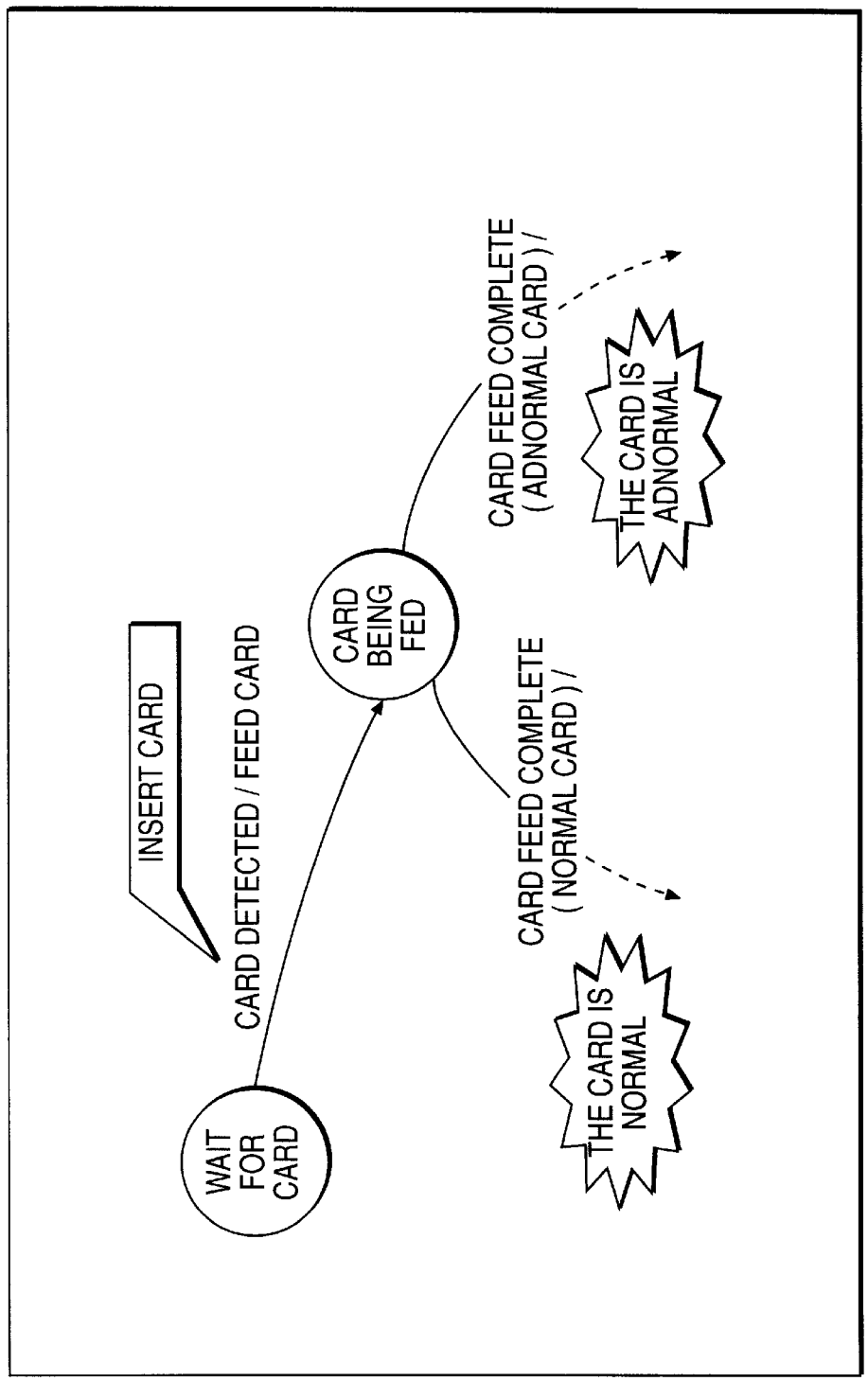
FIG. 26 is a diagram showing an example of a state transition diagram where the operation specification of a card feeder is described.
Figure 27:
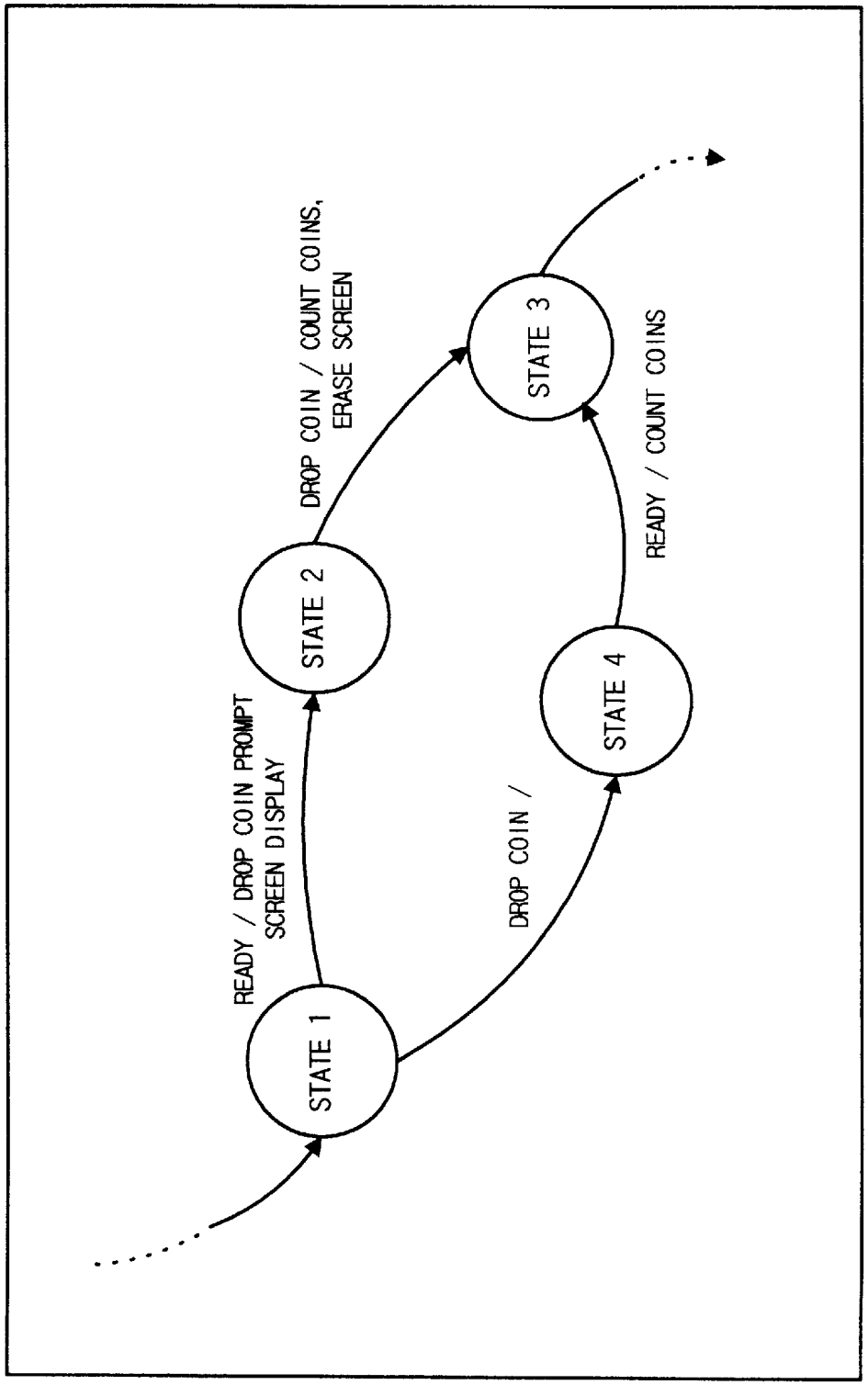
FIG. 27 is a diagram showing an example of a state transition diagram where the operation specification of a coin-counting system is described.

Another algorithm for analyzing input contents is as follows. This is effective for a specification description as shown in FIG. 16. In FIG. 16 which is created based on FIG. 26, a transition is added which occurs when the event "system error occurs" is received in the state "card being fed". Upon receiving this event, the end state immediately occurs. There is no such event description which determines what card is inserted. To include this description into the operation specification description, change the contents of input items to those shown in FIG. 17.

Figure 18:
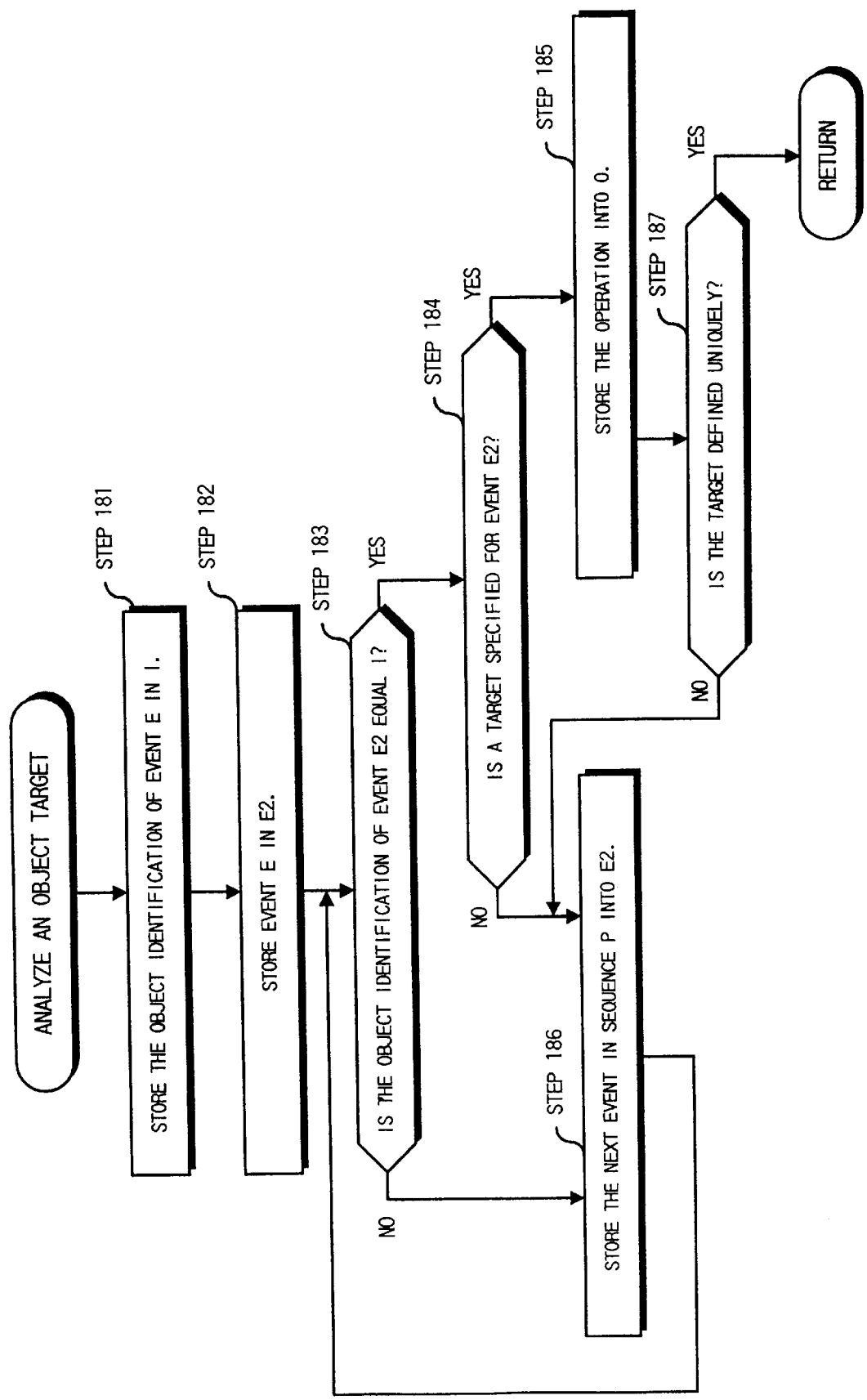
FIG. 18 is a flowchart showing the steps for analyzing the input contents in the system test support system used in the embodiment of this invention.

That is, the allowable range description "normal card, abnormal card" is added to the target operation field of event e1. This range description is added to all the event for which operations are defined. And, the flowchart in FIG. 14 is changed to that in FIG. 18. The algorithm shown in FIG. 18 differs from that in FIG. 14 in the processing in step 185 (which corresponds to step 145 in FIG. 14). In this step, if the definition of the target is unique, the analysis ends; otherwise, control is passed to step 186.

According to this algorithm, if an operation for which a target is not defined uniquely in the sequence is found, the system follows the sequence to find a uniquely-defined target for use as the target of the operation. The degree of restriction can be determined easily according to whether or not the description is unique.

Steps for Determining Output Contents

Figure 19:
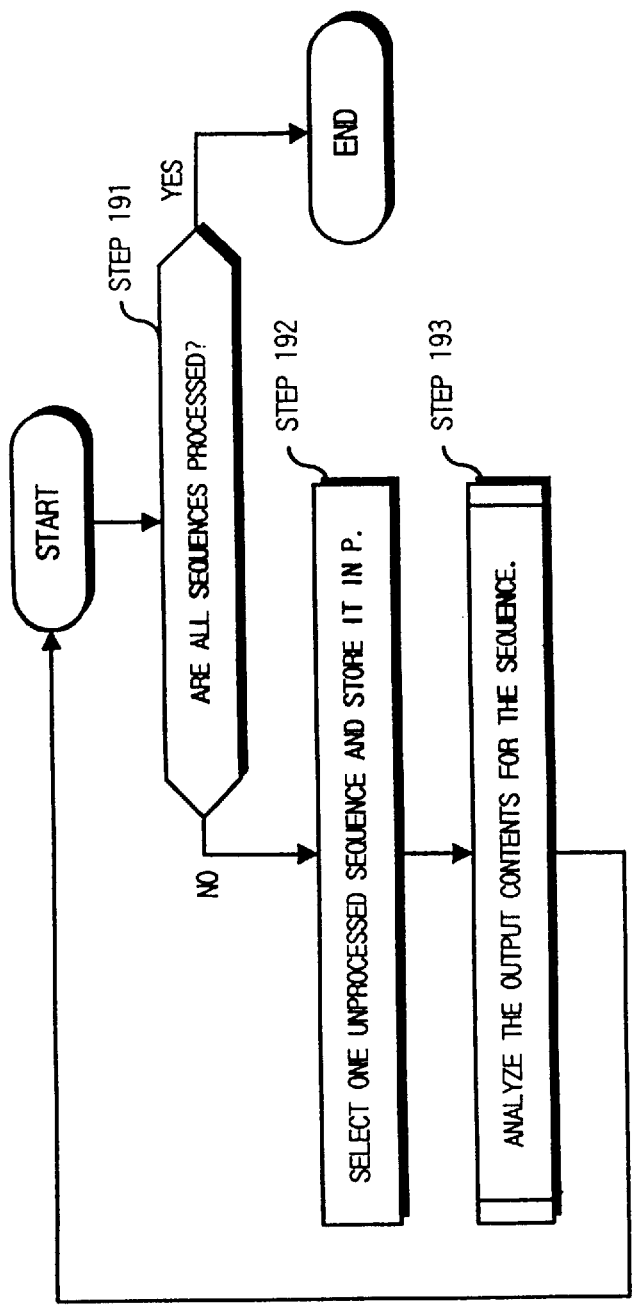
FIG. 19 is a flowchart showing the steps for determining the output contents in the system test support system used in the embodiment of this invention.
Figure 20:
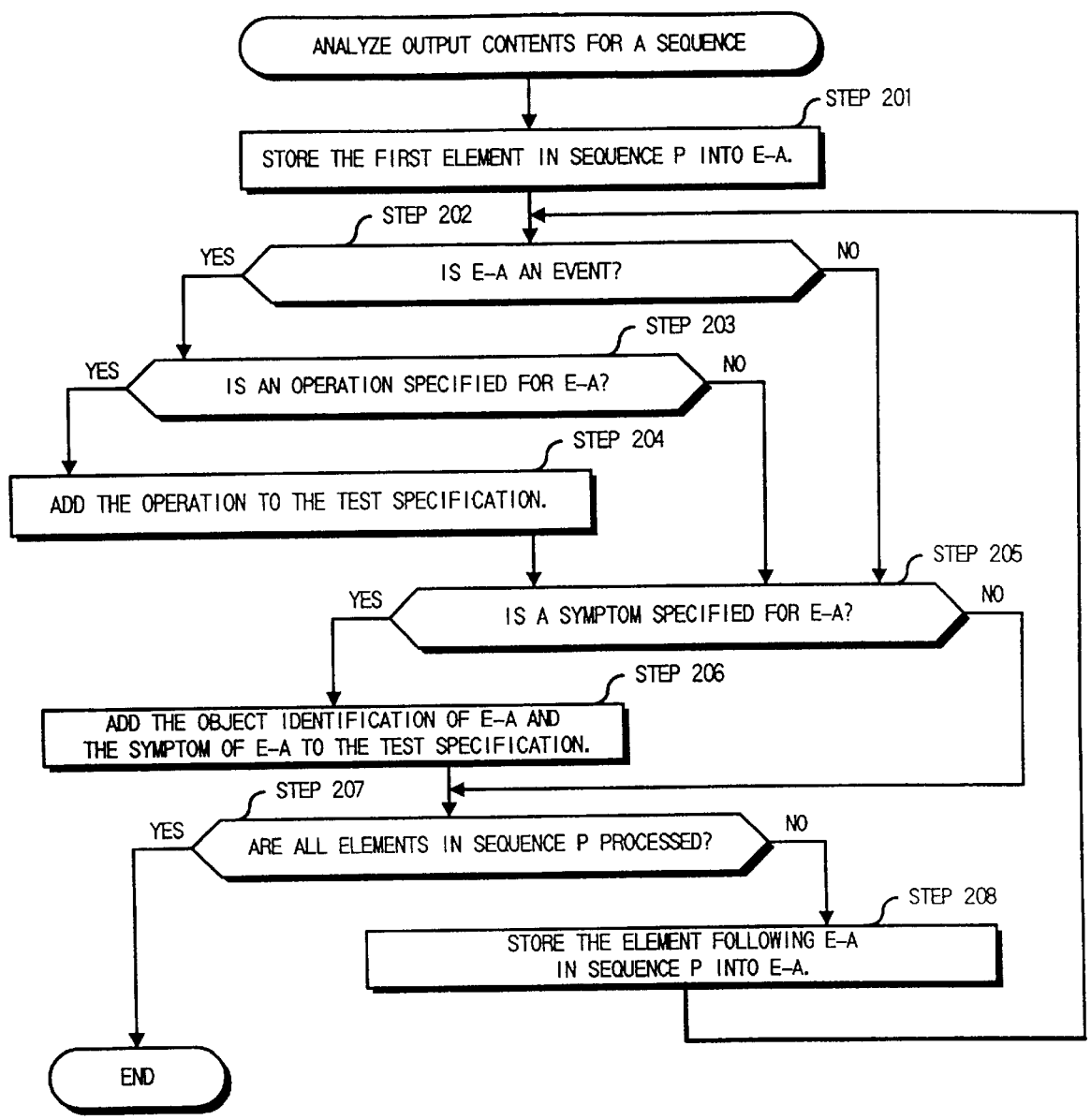
FIG. 20 is a flowchart showing the steps for analyzing the output contents (STEP 193) in the system test support system used in the embodiment of this invention.

Next, the output contents determining means 8 determines the output contents, which are symptoms to be confirmed, for the input contents of each test sequence. FIGS. 19 and 20 are flowcharts showing the steps for determining the output contents.

As shown in FIG. 19, the system sequentially selects unprocessed sequences, one at a time, and stores it into the temporary storage P (step 192) until all the sequences are processed (step 191). And, the system determines the output contents for the sequence P (step 193) through analysis and returns control to step 191.

FIG. 20 is a flowchart showing the steps for output contents analysis (step 193). The system stores the first element (event or action) contained in sequence P into the temporary storage E-A (step 201). If this E-A is an event (step 202) and if an operation is specified (step 203), the system adds ["operation" on "target"] (step 204) to the test specification based on the operation and the target obtained through analysis. Next, if a symptom is specified for E-A (step 205), the system adds the object identification of E-A and the symptom of E-A to the test specification (step 206) in the form "object identification, symptom."

When the system has processed all the elements in sequence P (step 207), it ends the procedure shown in FIG.

20; otherwise, it stores the element following E-A into E-A (step 208) and passes control back to step 202.

Steps for Determining Input Conditions

Figure 21:
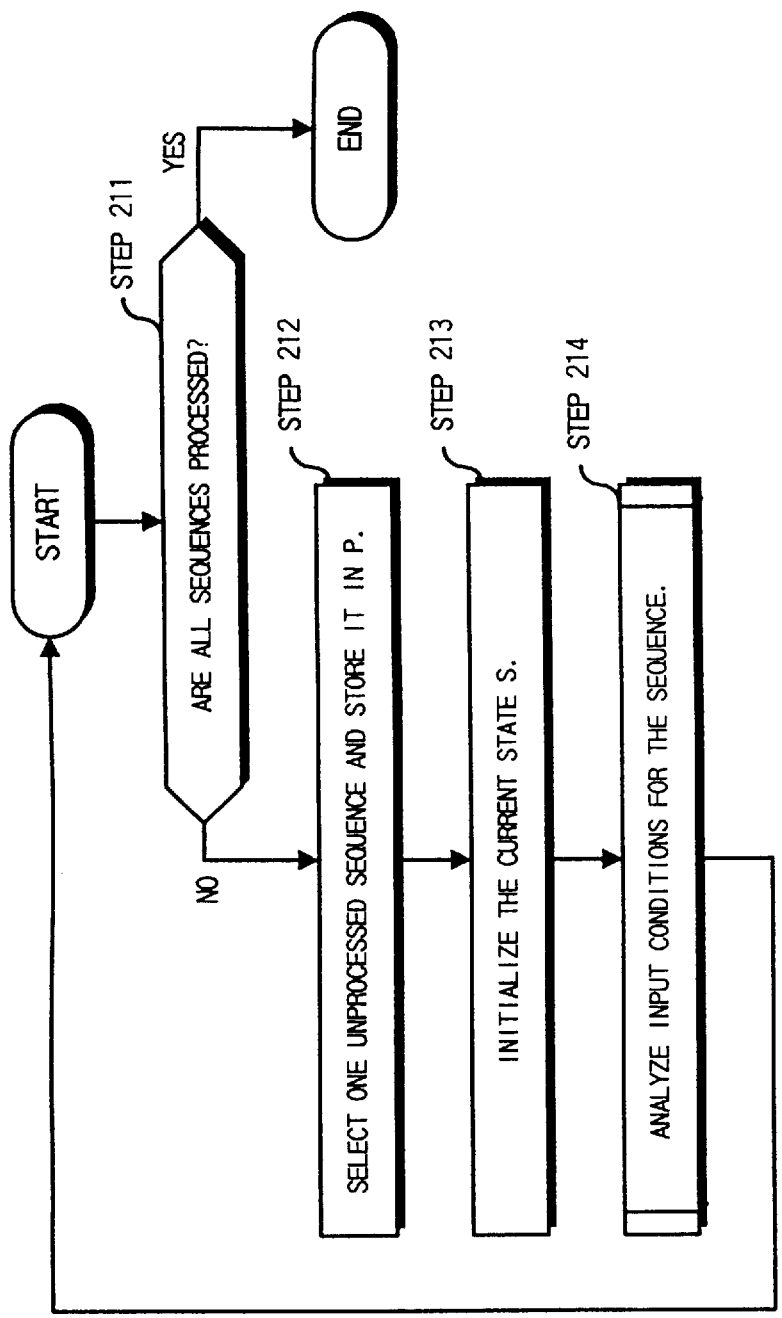
FIG. 21 is a flowchart showing the steps for determining the input conditions in the system test support system used in the embodiment of this invention.
Figure 22:
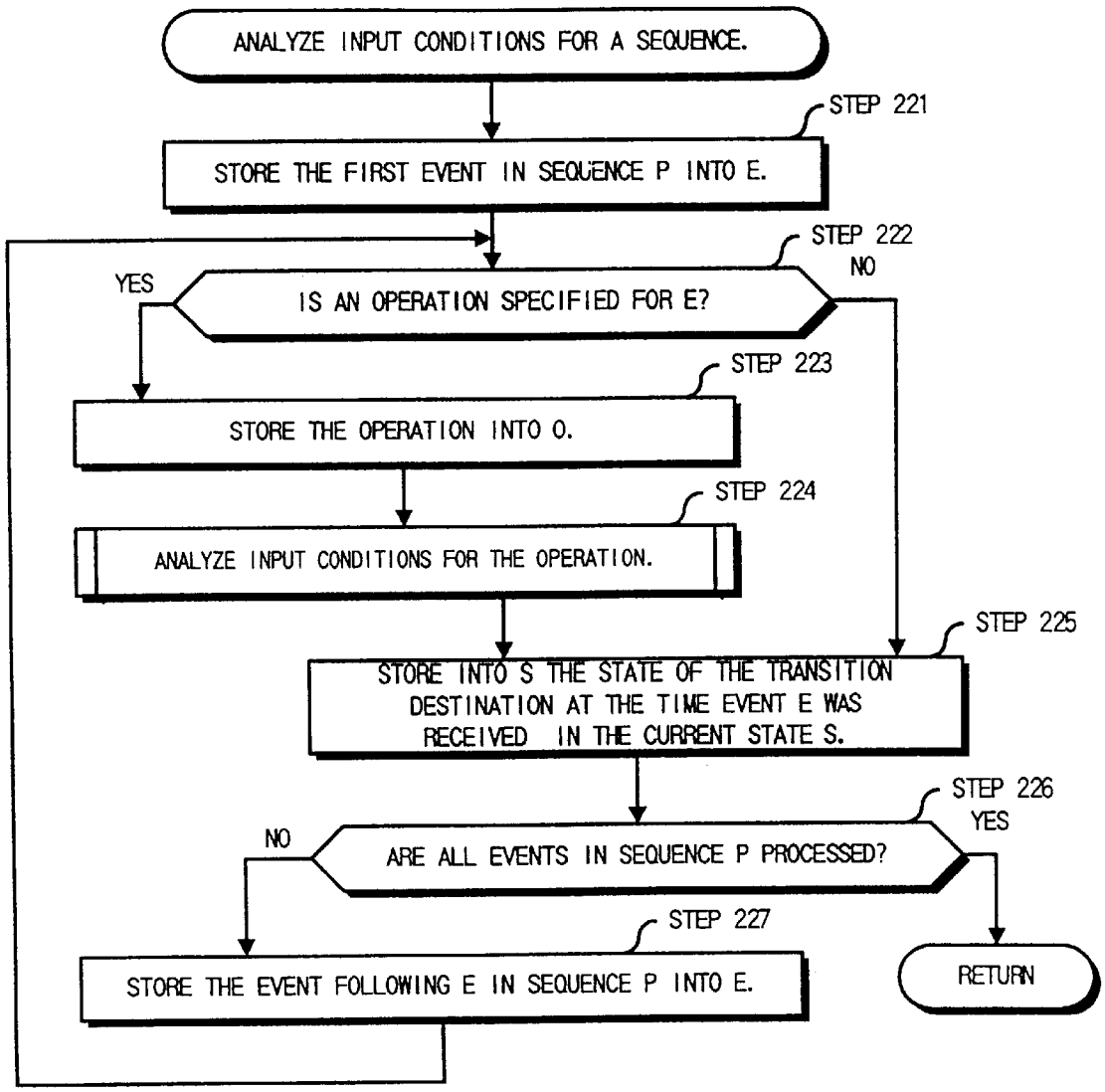
FIG. 22 is a flowchart showing the steps for analyzing the input conditions (STEP 214) in the system test support system used in the embodiment of this invention.
Figure 23:
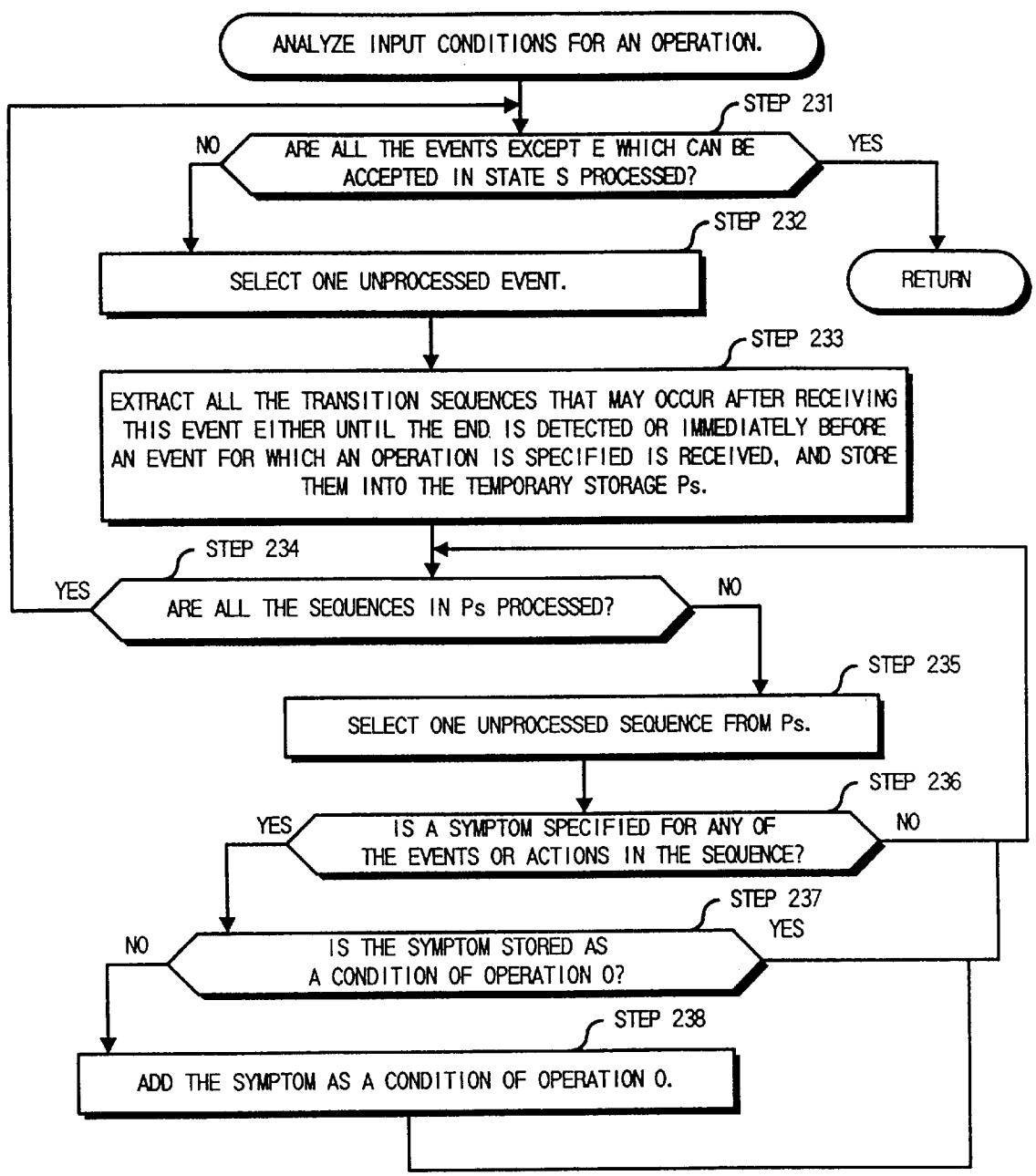
FIG. 23 is a flowchart showing the steps for analyzing the input conditions (STEP 224) in the system test support system used in the embodiment of this invention.

Next, based on the operation specification, output items, and output contents, the input condition determining means 9 determines the input conditions for input on each test sequence. In this case, the input condition is the input timing of an operation. FIGS. 21, 22, and 23 are the flowcharts showing the steps for input condition determination.

As shown in FIG. 21, the system selects unprocessed sequences, one at a time, and stores it in the temporary storage P (step 212) until all the sequences are processed (step 211). It also initializes the temporary storage S which retails the current state (step 213). The system then analyzes and determines input conditions for the selected sequence P (step 214) and passes control back to step 211.

FIG. 22 is a flowchart showing the steps for analyzing input conditions (step 214). The system stores the first event in sequence P into the temporary storage E (step 221). Only when an operation is specified for E (step 222), the system stores the operation into the temporary storage C (step 223) and analyzes the input conditions for the operation (step 224). And, it stores into S the state of the transition destination at the time event E was received in the current state S (step 225). When the system has processed all the events in sequence P (step 226), it ends the procedure; otherwise, it stores the event following E into E (step 227) and passes control back to step 222.

FIG. 23 shows the steps for input condition analysis (step 224). Here, the system detects a state in which there is a possibility that both a transition which is caused by an operation and a transition which is not caused by an operation but which causes a symptom may occur, and determines this symptom as the input condition.

More specifically, the system sequentially processes unprocessed events (step 232), one at a time, until it processes all the events except E which can be accepted in state S (step 231). The system then extracts all the transition sequences that may occur after receiving this event either until it reaches the end or immediately before it receives an event for which an operation is specified, and stores them into the temporary storage Ps (step 233).

Then, the system sequentially selects sequences (step 234), one at a time, until it processes all the sequences in Ps (step 234), and performs the following processing for each sequence. That is, if a symptom is specified for any of the events or actions in the selected sequence (step 236) and if this symptom is not yet stored as a condition for operation O (step 237), the system adds this symptom to the conditions of operation O (step 238), and passes control back to step 234.

In this embodiment, a typical case, where there are a plurality of transition sequences depending upon the input timing of operation, is detected by using a simple and fixed criterion. This is a state where there is a possibility that both a transition which is caused by an operation and a transition which is not caused by an operation but which causes a symptom may occur. In this case, the transition sequence varies according to whether an operation is performed immediately in the state or an operation is performed after confirming a symptom. In this embodiment, two test specifications are produced: one for instructions for an operation after confirming a symptom and the other for instructions for an operation before confirming a symptom.

Steps for Outputting a Test Specification

The input contents, output contents, and input conditions are output by the outputting means 6 as a test specification. Note that the output contents and input conditions need not always be generated or output; even in that case, appropriate input contents may be obtained.

Test Specification Example

FIG. 24 shows an example of data structure (test specification table) of a test specification. The test specification uses identification numbers (IDs) for all the test specification items to define the test flow.

For example, the meaning of test specification 2 is as follows: First, press the [drawer] button and confirm that the card insert slot lamp blinks. Then, insert a normal card before the prompt appears on the screen. Then, confirm that the screen changes to the password entry display, and so on.

This test specification is output by the outputting means 6. FIG. 25 shows an example of test item printout. For example, test specification 2, which is output under the name "test item 2", contains in the "check item" column the symptoms which will occur in response to an operation in the "operation" column. That is, after performing "press [drawer] button", check that "card insert slot lamp blinks." The result of checking is entered in the "accept/reject" column. Then, perform "insert normal card before insert prompt appears" and check that "password entry display appears." The result is also entered in the "accept/reject" column."

Effect of This Embodiment

As described above, the input contents are determined according to a plurality of transitions in this embodiment. For example, if an operation and an object are determined by a transition in the test sequence and if an operation target, which is a restricted object in the sequence, is determined by some other transition, not only the operation and object but also the operation target is determined as the input contents based on both transitions. A significant test may be done on a sequence, which is associated with a specific operation target, because the input contents which include not only an operation and object but also an operation target are determined and output. Therefore, this embodiment makes it possible to make a significant test even if the input contents are determined according to a plurality of transitions.

Also, because an operation target, a component of the input contents, is selected according to the level of restriction which is a simple and fixed criterion, a test specification for a specific sequence can be obtained speedily and in a simple configuration.

The symptoms to be confirmed for each test sequence, which are produced by this embodiment, also help the developer make a system test efficiently. The output contents, consisting of the input contents and output items, further increase test reliability.

The input conditions are output in a test specification in this embodiment. This allows a significant test to be made even if the system operation differs according to the input condition such as an input timing.

In this embodiment, a typical case, where a plurality of transition sequences are created by input conditions such as an input timing of operation, is detected according to a simple, fixed criterion. This is a state where there is a possibility that both a transition which is caused by an operation and a transition which is not caused by an operation but which causes a symptom may occur. In this case, the transition sequence varies according to whether an operation is performed immediately in the state or an operation is performed after confirming a symptom. In this embodiment, two test specifications are produced: one for instructions for an operation after confirming a symptom and the other for instructions for an operation before confirming a symptom.

(3) Other Embodiments

This invention is not restricted to the preferred embodiment described herein, but may be embodied in other specific forms, such as those described below, without departing from the spirit or essential characteristics thereof. For example, the GUI (Graphical User Interface) explained in the embodiment is not always necessary for entering or specifying various types of information; for example, such information may be entered from the keyboard as character strings. Objects may also be set up in any form.

A criterion on which test sequence selection is based or a criterion on which operation target selection from a plurality of transitions is based may be implemented in any form. For example, the most restrictive operation object need not be used when a plurality of sequences are set up into a single sequence or when a test on some specific sequence such as that for exception processing is omitted. For example, a tested part may be omitted or only a specific symptom indicating whether or not the final state has been reached may be output. A criterion on which input condition determination is based may also be implemented in any form. For example, a symptom produced by the system need not always be confirmed but a specific operation may be performed when a specified time has elapsed. Conditions may take any form.

In this invention, the input contents, output contents, or input conditions which are determined "according to" several types of information; however, all the information need not always be used. They may be determined without using some type of information if possible.

Effects of the Invention

Because a test specification containing the input contents applicable to a test sequence determined according to a plurality of transitions is output according to this invention, the system helps a developer make a system test efficiently.

While a preferred embodiment has been described, variations thereto will occur to those skilled in the art within the scope of the present inventive concepts which are delineated by the following claims.

What is claimed is:

1. A system test support system comprising:
   an operation specification inputting means for entering a state transition model representing a system operation specification in the form of a plurality of transitions, each transition including events and actions;
   a test sequence setting means for setting up a test sequence to be tested from a plurality of transition sequences, each one of said plurality of transition sequences consisting of a series of said plurality of transitions included in said state transition model;
   identification setting means for setting up an object identification indicating an object associated with each transition for at least each transition included in said test sequence;
   input item setting means for setting up an input item containing an operation, which causes an event for each transition, and an operation target, which indicates the type of object on which the operation is to be performed;
   input contents determining means for automatically generating input test data adapted to said test sequence by analyzing and testing the cause of an event for each transition along said test sequence, based on said object identification and said input item; and
   outputting means for outputting a test specification including said input test data provided by the input contents determining means.

2. A system test support system as claimed in claim 1, further comprising:
   output item setting means for setting up, for each one of said plurality of transitions, an externally checkable phenomenon caused by the transition as an output item; and
   output contents determining means for analyzing and determining output test data for indicating a phenomenon to be checked for said input test data, based on said input test data and said output item;
   wherein said outputting means outputs a test specification including said output data for test.

3. A system test support system as claimed in claim 1, further comprising:
   input condition determining means for detecting a phenomenon causing a transition sequence to diverge and for determining whether the phenomenon is present as an input condition when said plurality of transition sequences are performable according to operation timing;
   wherein said outputting means outputs a test specification including said input condition.

4. A system test support system as claimed in claim 1, wherein said input contents determining means specifies a most restrictive operation target in said test sequence as an operation target of said event.

5. A system test support system as claimed in claim 1, wherein, if an operation is set up for an event associated with each transition included in said test sequence, said input contents determining means specifies an operation target of the event and turns it into input data for test.

6. A system test support system as claimed in claim 1 wherein, if an operation is set up for an event associated with each transition included in said test sequence and if an operation target is specified for the event, said input contents determining means makes an output data for test from the operation and the operation target.

7. A system test support method comprising:
   an operation specification inputting step for entering a state transition model, representing a system operation specification, in the form of plurality of transitions, each transition including events and actions;
   a test sequence setting step for setting up a test sequence to be tested from transition sequences each consisting of a series of said transitions included in said state transition model;
   an identification setting step for setting up an object identification indicating object associated with each transition for at least each transition included in said test sequence;
   an input item setting step for setting up an input item containing an operation which causes an event for each transition and an operation target which indicates the type of an object on which the operation is to be performed;
   an input contents determining step for automatically generating input test data adapted to said test sequence by analyzing and testing which causes an event for each transition, based on said object identification and said input item so as to cause transitions along said test sequence; and
   an outputting step for outputting a test specification including said input test data provided by the input contents determining step.

8. A system test support method as claimed in claim 7, further comprising:

an output item setting step for setting up, for each transition, an externally checkable phenomenon caused by the transition as an output item; and an output contents determining step for analyzing and determining output test data for indicating a phenomenon to be checked for said input test data, based on said input test data and said output item;

wherein said outputting step outputs a test specification including said output data for test.

9. A system test support method as claimed in claim 7, further comprising:

an input condition determining step for detecting a phenomenon causing a transition sequence diverge and determining whether the phenomenon is present or not, as an input condition, when a plurality of transition sequences are performable according to operation timing;

wherein said outputting step outputs a test specification including said input condition.

10. A system test support method as claimed in claim 7, wherein said input contents determining step specifies the most restrictive operation target in said test sequence as an operation target of said event.

11. A computer-readable medium including a computer-executable program for a system test support method, comprising:

an operation specification inputting step for entering a state transition model, representing a system operation specification, in the form of a plurality of transitions, each transition including events and actions;

an test sequence setting step for setting up a test sequence to be tested from a plurality of transition sequences, each one of the plurality of transition sequences consisting of a series of transitions included in said state transition model;

an identification setting step for setting up an object identification indicating the object associated with each transition for at least each transition included in said test sequence;

an input item setting step for setting up an input item containing an operation which causes an event for each transition and an operation target which indicates the type of an object on which the operation is to be performed;

an input contents determining step for automtically generating input test data adapted to said test sequence by analyzing and test which causes an event for each transition, based on said object identification and said input item so as to cause transitions along said test sequence; and an outputting step for outputting a test specification including said input test data provided by the input contents determining step.

* * * * *